(12) United States Patent
Lane, Jr.

(10) Patent No.: US 8,585,090 B2
(45) Date of Patent: Nov. 19, 2013

(54) HIGH EFFICIENCY PRETENSIONER

(75) Inventor: Wendell Chenney Lane, Jr., Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 123 days.

(21) Appl. No.: 12/826,089

(22) Filed: Jun. 29, 2010

(65) Prior Publication Data
US 2011/0316265 A1    Dec. 29, 2011

(51) Int. Cl.
     *B60R 22/46*    (2006.01)
(52) U.S. Cl.
     USPC .......................................... 280/806; 297/480
(58) Field of Classification Search
     USPC ................... 280/805, 806, 807; 297/474, 480
See application file for complete search history.

(56) References Cited

U.S. PATENT DOCUMENTS

| | | | | |
|---|---|---|---|---|
| 2,319,557 | A | * 5/1943 | Ritz-Woller | ............... 248/279.1 |
| 3,891,271 | A | 6/1975 | Fieni | ............................. 297/386 |
| 3,901,531 | A | 8/1975 | Prochazka | .................... 280/150 |
| 4,288,098 | A | 9/1981 | Tsuge et al. | |
| 4,508,287 | A | 4/1985 | Nilsson | ......................... 242/107 |
| 4,917,210 | A | 4/1990 | Danicek et al. | ............... 180/268 |
| 5,149,135 | A | * 9/1992 | Konishi et al. | ............... 280/806 |
| 5,294,150 | A | 3/1994 | Steffens | |
| 5,366,245 | A | 11/1994 | Lane, Jr. | ....................... 280/806 |
| 5,374,110 | A | 12/1994 | Hiramatsu | |
| 5,516,148 | A | * 5/1996 | Ohira | ............................ 280/808 |
| 5,519,997 | A | 5/1996 | Specht | ............................. 60/632 |
| 5,553,890 | A | * 9/1996 | Bühr et al. | .................... 280/806 |
| 5,588,608 | A | 12/1996 | Imai et al. | |
| 5,671,949 | A | 9/1997 | Bauer et al. | |
| 5,676,397 | A | * 10/1997 | Bauer | ........................... 280/806 |
| 5,911,440 | A | 6/1999 | Ruddick et al. | ............... 280/806 |
| 5,971,488 | A | 10/1999 | Pedronno et al. | |
| 6,068,664 | A | 5/2000 | Meyer et al. | .................... 797/480 |
| 6,131,951 | A | * 10/2000 | Chicken et al. | ............... 280/806 |
| 6,149,095 | A | 11/2000 | Specht et al. | ................. 242/374 |
| 6,155,512 | A | 12/2000 | Specht et al. | ................. 242/374 |
| 6,186,549 | B1 | 2/2001 | Specht et al. | ................. 280/806 |
| 6,299,090 | B1 | 10/2001 | Specht et al. | ................. 242/374 |
| 6,340,176 | B1 | * 1/2002 | Webber et al. | ................ 280/806 |
| 6,382,674 | B1 | 5/2002 | Specht et al. | ................. 280/806 |
| 6,419,271 | B1 | 7/2002 | Yamada et al. | |

(Continued)

FOREIGN PATENT DOCUMENTS

DE      103 08 121 B3     10/2004
EP      0 625 450 A2      5/1994

(Continued)

*Primary Examiner* — Paul N Dickson
*Assistant Examiner* — Barry Gooden, Jr.
(74) *Attorney, Agent, or Firm* — Brinks Gilson & Lione

(57) ABSTRACT

A linear pretensioner device for motor vehicle belt restraint systems of the type mountable to a motor vehicle structure and coupled with a belt restraint system component. In one form, the linear pretensioner includes a stroking housing forming a bore and a cable coupled with the stroking housing and to the belt restraint component. A main housing adapted to be fixed to the motor vehicle structure is positioned within the bore of the stroking housing, with the stroking housing telescopically overfitting the main housing. The main housing and the stroking housing form an expanding chamber that enlarges when pressurized by a gas generator. Upon activation, the gas generator drives the stroking housing along the main housing to exert tension on the cable. In another form, the pretensioner has an inner housing positioned within a bore of an outer housing, and the cable is coupled with the inner housing.

28 Claims, 13 Drawing Sheets

(56) References Cited

U.S. PATENT DOCUMENTS

| | | |
|---|---|---|
| 6,450,435 B2 | 9/2002 | Junker et al. |
| 6,454,306 B1 | 9/2002 | Cunningham et al. |
| 6,516,726 B2 | 2/2003 | Specht .................... 102/530 |
| 6,527,298 B2 | 3/2003 | Kopetzky |
| 6,527,299 B2 | 3/2003 | Specht et al. ............ 280/806 |
| 6,561,936 B1 | 5/2003 | Betz et al. |
| 6,626,463 B1 | 9/2003 | Arima et al. |
| 6,682,097 B2 * | 1/2004 | Krauss et al. ............ 280/806 |
| 6,702,327 B2 * | 3/2004 | Janz ......................... 280/808 |
| 6,712,394 B2 | 3/2004 | Betz et al. |
| 6,820,310 B2 | 11/2004 | Woodard et al. |
| 6,902,195 B2 | 6/2005 | Ball et al. |
| 7,118,133 B2 | 10/2006 | Bell et al. |
| 7,131,669 B2 * | 11/2006 | Morita et al. ............ 280/808 |
| 7,172,218 B2 | 2/2007 | Nakano et al. |
| 7,188,868 B2 * | 3/2007 | Yamaguchi ............... 280/806 |
| 7,338,083 B2 | 3/2008 | Sakata |
| 7,350,734 B2 | 4/2008 | Stevens |
| 7,380,832 B2 | 6/2008 | Gray et al. |
| 7,490,857 B2 | 2/2009 | Tomita |
| 7,533,902 B2 | 5/2009 | Arnold et al. |
| 7,631,900 B2 | 12/2009 | Nakayama et al. |
| 7,644,952 B2 | 1/2010 | Holtz |
| 7,823,924 B2 | 11/2010 | Dewey et al. |
| 2002/0030396 A1 | 3/2002 | Stevens |
| 2002/0043796 A1 * | 4/2002 | Webber et al. ............ 280/806 |
| 2002/0088890 A1 * | 7/2002 | Shih et al. ................. 242/374 |
| 2003/0029661 A1 * | 2/2003 | Motozawa ................. 180/274 |
| 2003/0184076 A1 * | 10/2003 | Devereaux et al. ....... 280/806 |
| 2004/0046382 A1 * | 3/2004 | Ball et al. ................. 280/806 |
| 2006/0087108 A1 | 4/2006 | Midorikawa |
| 2006/0118347 A1 * | 6/2006 | Zelmer et al. ............ 180/268 |
| 2006/0213191 A1 * | 9/2006 | Borg et al. ................ 60/512 |
| 2006/0279077 A1 | 12/2006 | Nakano et al. |
| 2007/0013186 A1 | 1/2007 | Bell |
| 2007/0024045 A1 * | 2/2007 | Zelmer et al. ............ 280/806 |
| 2007/0029774 A1 | 2/2007 | Kuroki |
| 2007/0194565 A1 * | 8/2007 | Clute ........................ 280/806 |
| 2009/0218802 A1 | 9/2009 | Singer et al. ............. 280/807 |
| 2010/0032967 A1 * | 2/2010 | Otsuka ...................... 292/240 |
| 2010/0037610 A1 | 2/2010 | Singer ....................... 60/632 |
| 2011/0012418 A1 * | 1/2011 | Mages ....................... 297/480 |
| 2011/0221178 A1 | 9/2011 | Lane, Jr. et al. |
| 2011/0316265 A1 * | 12/2011 | Lane, Jr. ................... 280/806 |

FOREIGN PATENT DOCUMENTS

| | | |
|---|---|---|
| EP | 0 685 371 B1 | 7/1997 |
| EP | 1 078 827 A2 | 2/2001 |
| FR | 2 721 073 | 12/1995 |
| JP | 11-321559 | 11/1999 |
| WO | WO 02/062632 A1 | 8/2002 |

* cited by examiner

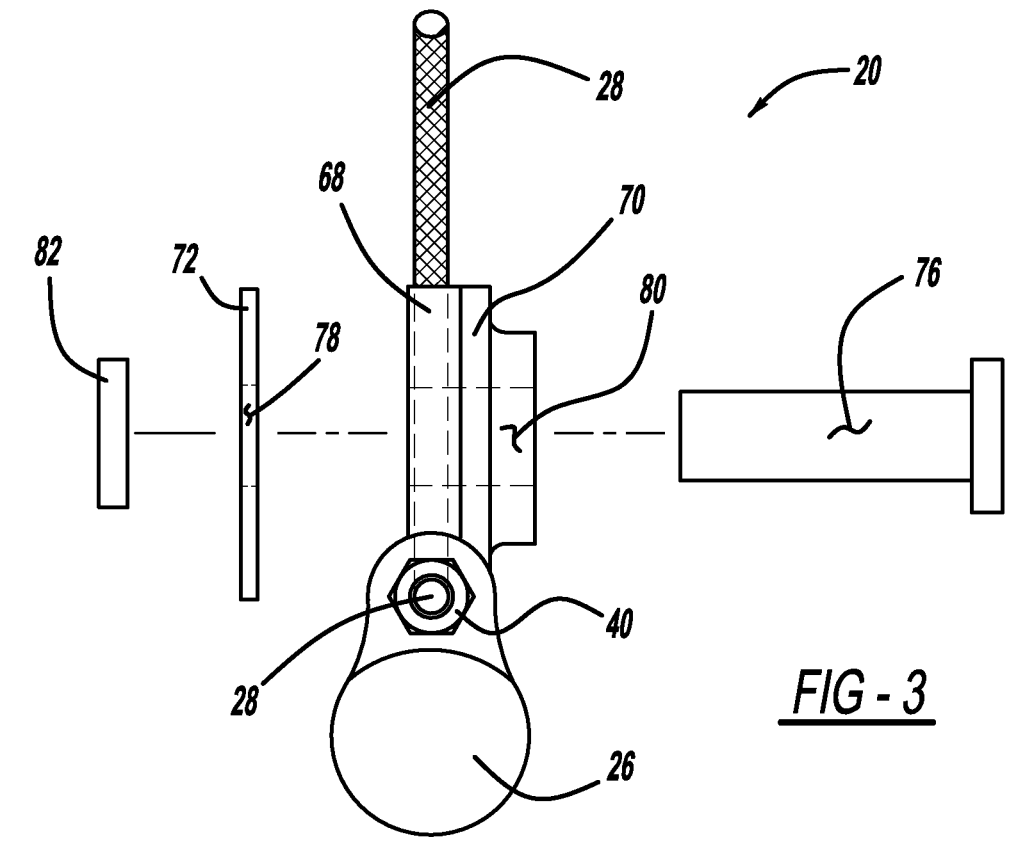
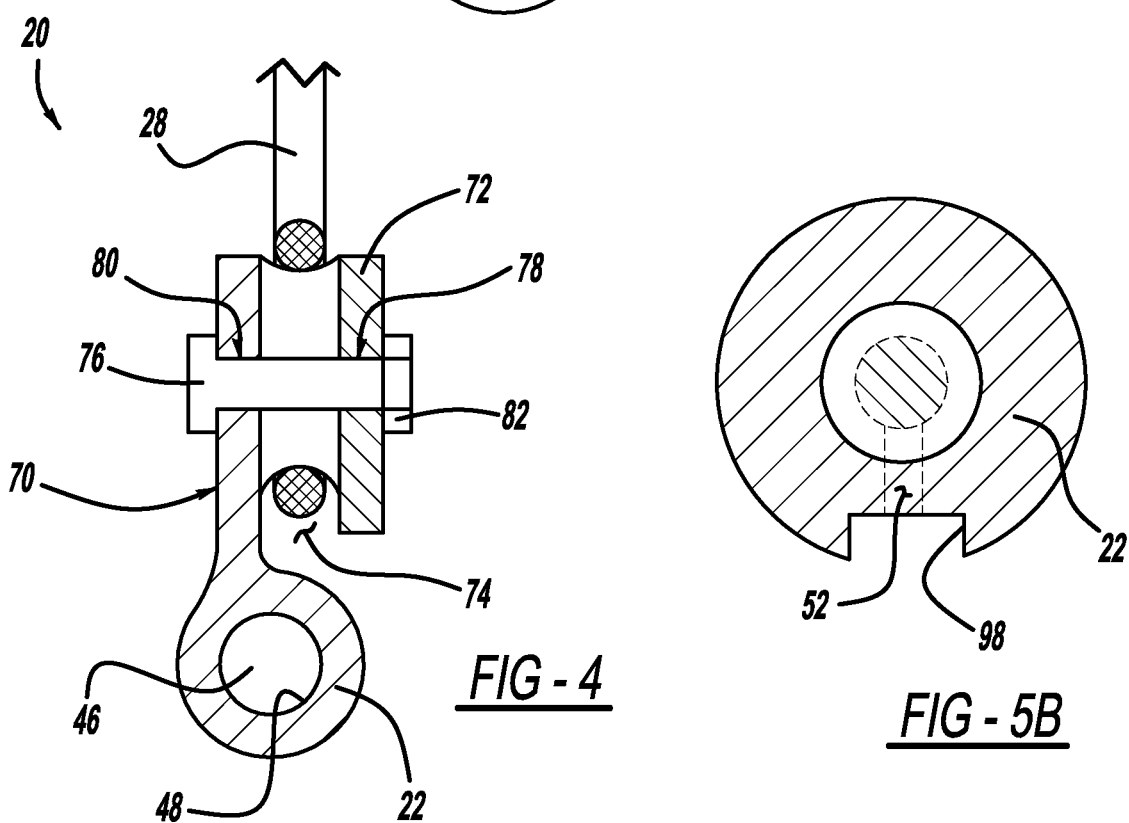

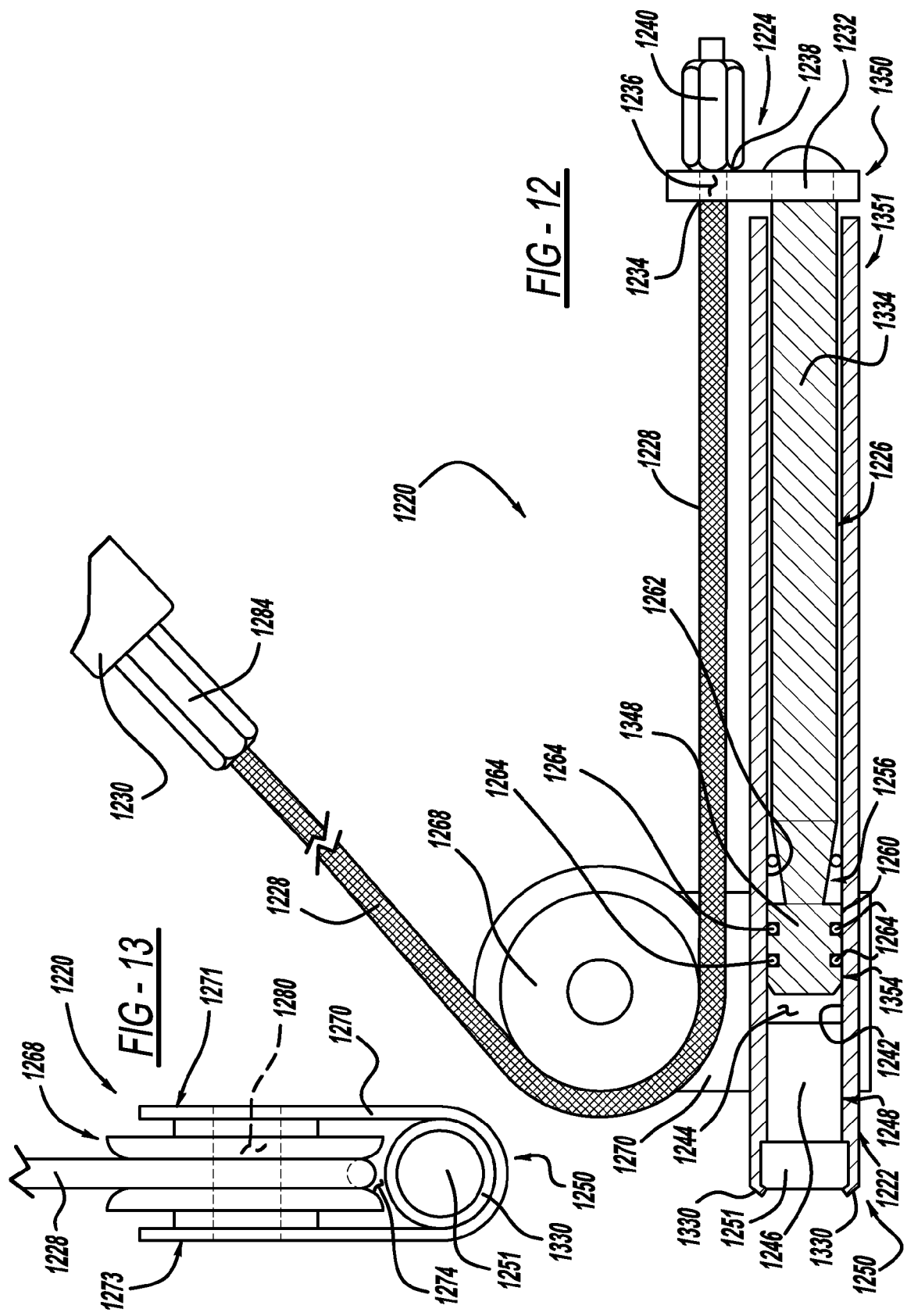

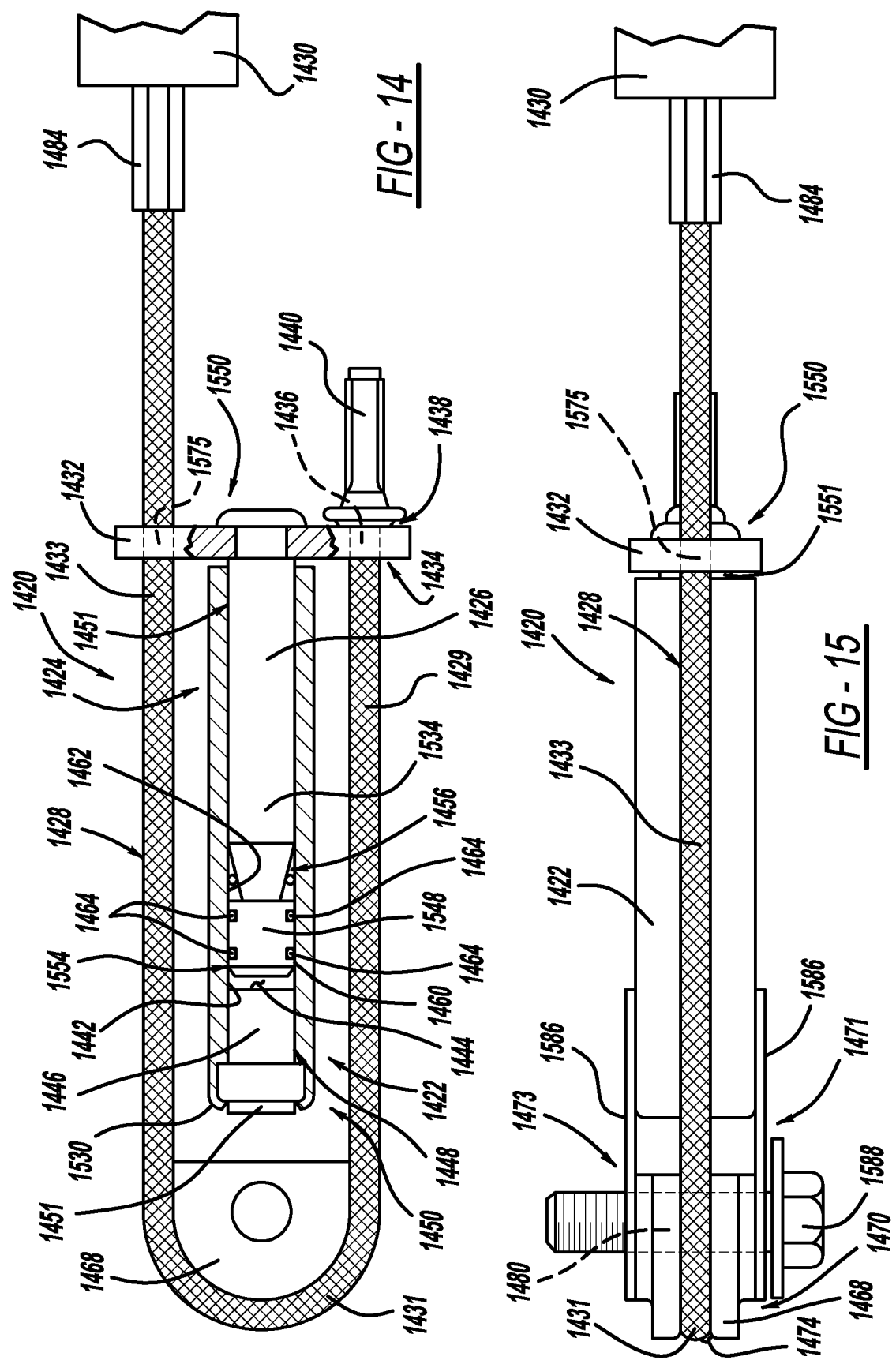

HIGH EFFICIENCY PRETENSIONER

FIELD OF THE INVENTION

The present invention relates generally to seatbelt restraint systems for motor vehicles, and more particularly, to a linear seatbelt pretensioner for a seatbelt restraint system.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation.

Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either prior to impact of the vehicle (also known as a "pre-pretensioner") or at an early stage of a sensed impact to enhance occupant restraint performance. The pretensioner takes out slack in the webbing and permits the belt restraint system to couple with the occupant early in the crash sequence. Upon the detection of a condition leading to an imminent impact or rollover, or in the event of an actual rollover, seat belt webbing is automatically and forcibly retracted by the pretensioner to tighten the seat belt against the occupant.

One type of pretensioning device is a pyrotechnic linear pretensioner (PLP), which can be implemented as a pyrotechnic buckle pretensioner (PBP) that is attached to a seat belt buckle. PLPs can also be attached to a webbing guide loop or seatbelt anchorage. Since both types pull a seat belt system component linearly to apply tension in the belt webbing, both PLPs and PBPs can be collectively referred to as a PLP. Examples of designs of PLPs and PBPs are provided by U.S. Pat. No. 6,068,664, which is hereby incorporated by reference. Typical PLPs having included a pyrotechnic charge that is fired when a collision occurs, producing expanding gas which pressurizes a gas chamber within a tube, which forces a piston down the tube. The piston is connected with the belt system by a cable or strap. Stroking of the piston tightens or "pretensions" the belt against the occupant.

One design challenge with current linear and buckle pretensioners utilizing gas generators is efficient utilization of the gas volume produced by the generator. Typically, a significant volume of the gas produced by the gas generator leaks out of the device. Leak paths may be located around the piston, through the piston, and/or through the piston stroking tube around the opening through which the cable passes. A cable affixed to the piston typically has an uneven shape that is very difficult to seal around. Leaks paths allow gas to leak from the device, decreasing the pressure available for pretensioning the seat belt. Manufacturers have been forced to use larger gas generators to compensate for the loss. Moreover, manufacturing variations and the related lack of control of leakage paths can affect the repeatability of performance of the PLP.

SUMMARY OF THE INVENTION

The present invention provides a PLP that substantially reduces leak paths for gas to escape from the PLP device. The leak paths surrounding the cable are eliminated by the inventive design of the present PLP.

A linear pretensioner is provided for use as part of a motor vehicle occupant belt restraint system of the type mountable to a motor vehicle structure and coupled with a belt restraint system component. Upon being activated, the pretensioner pulls the belt restraint component to pretension the belt restraint system.

In one embodiment, the pretensioner includes a stroking housing forming a bore. A cable is coupled with the stroking housing and to the belt restraint component. A main housing adapted to be fixed to the motor vehicle structure is positioned in the bore of the stroking housing, with the stroking housing telescopically overfitting the main housing. The main housing and the stroking housing form an expanding chamber that enlarges when pressurized by a gas generator. Upon activation, the gas generator drives the stroking housing along the main housing to exert tension on the cable.

In another embodiment, the pretensioner includes an outer housing forming a bore, wherein the outer housing is adapted to be fixed to the motor vehicle structure and an inner housing positioned in the bore of the outer housing, wherein the outer housing telescopically overfits the inner housing. A projection is located outside of the bore of the outer housing and is coupled with the inner housing. A cable is coupled with the projection and to the belt restraint component. The cable is located entirely outside of the bore of the outer housing. The inner housing and the outer housing form an expanding chamber that enlarges when pressurized by a gas generator, wherein upon activation, the gas generator drives an end of the inner housing out of the bore of the outer housing to exert tension on the cable.

In yet another embodiment, the pretensioner includes an outer housing, an inner housing, and a cable having at least three portions. The outer housing forms a bore and is adapted to be fixed to motor vehicle structure. The inner housing is positioned in the bore of the outer housing, and the outer housing telescopically overfits the inner housing. The cable is coupled with the inner housing and a belt restraint component. The cable includes a pretensioner end portion coupled to the inner housing and routed adjacent to and generally parallel with the inner and outer housings. The cable also includes an intermediate portion connected to the pretensioner end portion, the intermediate portion being routed around a guide feature. In addition, the cable includes a belt end portion connected to the intermediate portion and coupled with the belt restraint component. The belt end portion is routed adjacent to and generally parallel with the inner and outer housings, and the belt end portion is also routed generally parallel to the pretensioner end portion of the cable. The inner and outer housings form an expanding chamber that enlarges when pressurized by a gas generator, wherein upon activation, the gas generator drives the inner housing along the bore of the outer housing to exert tension on the cable.

Additional benefits and advantages of the present invention will become apparent to those skilled in the art to which the present invention relates from the subsequent description and the appended claims, taken in conjunction with the accompanying drawings. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a partially exploded end view of the pretensioner of FIGS. 1 and 2;

FIG. 4 is a cross sectional view of the pretensioner of FIGS. 1-3, taken transversely along the line 4-4 of FIG. 1;

FIG. 5B is a cross-sectional view of the pretensioner of FIG. 5A, taken transversely along the line 5B-5B of FIG. 5A;

FIG. 12 is a side view of still another pretensioner in accordance with the principles of the present invention, with the pretensioner partially cut away to show a side cross-sectional view;

FIG. 13 is an end view of the pretensioner of FIG. 12, in accordance with the principles of the present invention;

FIG. 14 is a side view of still another pretensioner in accordance with the principles of the present invention, with the pretensioner partially cut away to show a side cross-sectional view;

FIG. 15 is a plan view of the pretensioner of FIG. 14, according to the principles of the present invention.

DETAILED DESCRIPTION OF INVENTION

Figure 1:
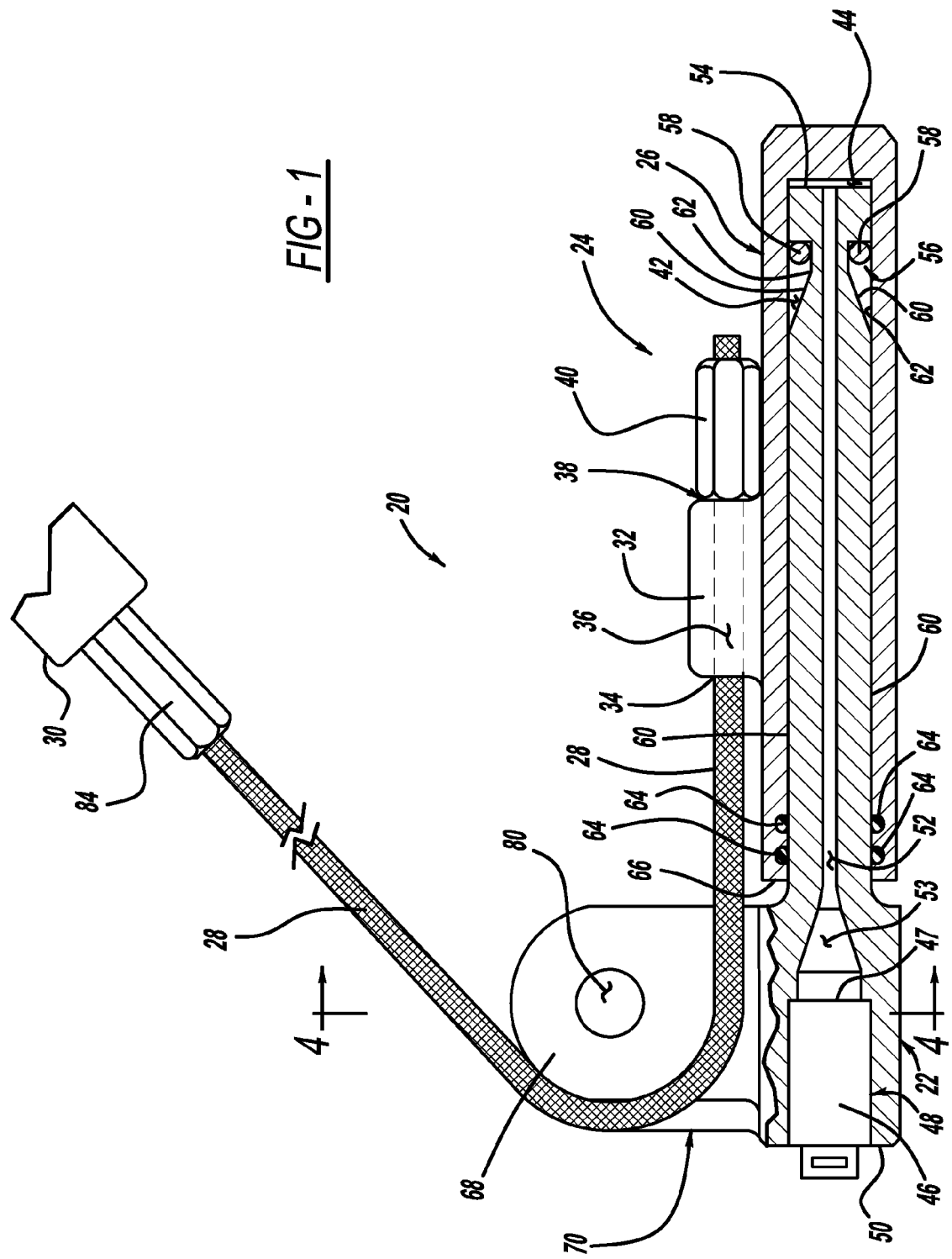
FIG. 1 is a side view of a pretensioner in accordance with the principles of the present invention, with the pretensioner partially cut away to show a side cross-sectional view.

The following description is merely exemplary in nature and is not intended to limit the present disclosure or its application or uses.

Referring now to FIGS. 1-4, a linear pretensioner in accordance with the present invention is shown in FIGS. 1-4 and is generally designated by reference number 20. Sub-assemblies of the pretensioner 20 are shown, including main housing 22, and stroking housing and cable assembly 24. In this example, the linear pretensioner 20 is used as part of a motor vehicle occupant belt restraint system of the type mountable to a motor vehicle structure and coupled with a belt restraint system component.

The stroking housing and cable assembly 24 includes a stroking housing 26 and a flexible cable 28. The cable 28 is coupled to the stroking housing 26 and to a belt restraint component 30. For example, the cable 28 may be coupled to the stroking housing 26 through a projection 32, wherein the projection 32 extends from an exterior side of the stroking housing 26. The cable 28 is inserted through a first end 34 of an aperture 36 in the projection 32 and extends through a second end 38 of the aperture 36. The cable 28 is secured to a cable stop 40 adjacent the second end 38 of the aperture 36 to retain the cable 28 to the stroking housing 26 and prevent it from being retracted back through the aperture 36. In this way, the projection 32 is configured to assist with retaining the cable 28 to the stroking housing 26. The cable stop 40 prevents the cable 28 from being pulled back through the aperture 36 once the cable stop 40 is installed. The cable 28 may be secured to the cable stop 40 by crimping or any other suitable means, without falling beyond the spirit and scope of the present invention.

It should be understood that the projection 32 and cable stop 40 are merely one example of a means for securing the cable 28 to the stroking housing 26 within the spirit and scope of the present invention. Alternative means for fastening the cable 28 to the stroking housing 26 could be used without falling beyond the spirit and scope of the present invention. For example, the cable 28 could be fastened or secured to the stroking housing 26 by glue, crimping, knot, of any other suitable means.

The stroking housing 26 forms a bore 42 and is slid over an open distal end 54 of the main housing 22. The main housing 22 is positioned in the bore 42 of the stroking housing 26, such that the stroking housing 26 telescopically overfits the main housing 22 with a sliding fit. The stroking housing 26 may form a cross-sectional shape which is generally circular, with the main housing 22 forming a cross-sectional shape which corresponds with the shape of the stroking housing 26. In this example, the main housing 22 and the stroking housing 26 are generally formed as right circular cylinders.

The main housing 22 and the stroking housing 26 form an expanding chamber 44 that enlarges when pressurized by a gas generator 46. Upon activation, the gas generator 46 pressurizes the expanding chamber 44, which causes it to expand and drive the stroking housing 26 along the main housing 22 to exert tension on the cable 28.

Figure 2:
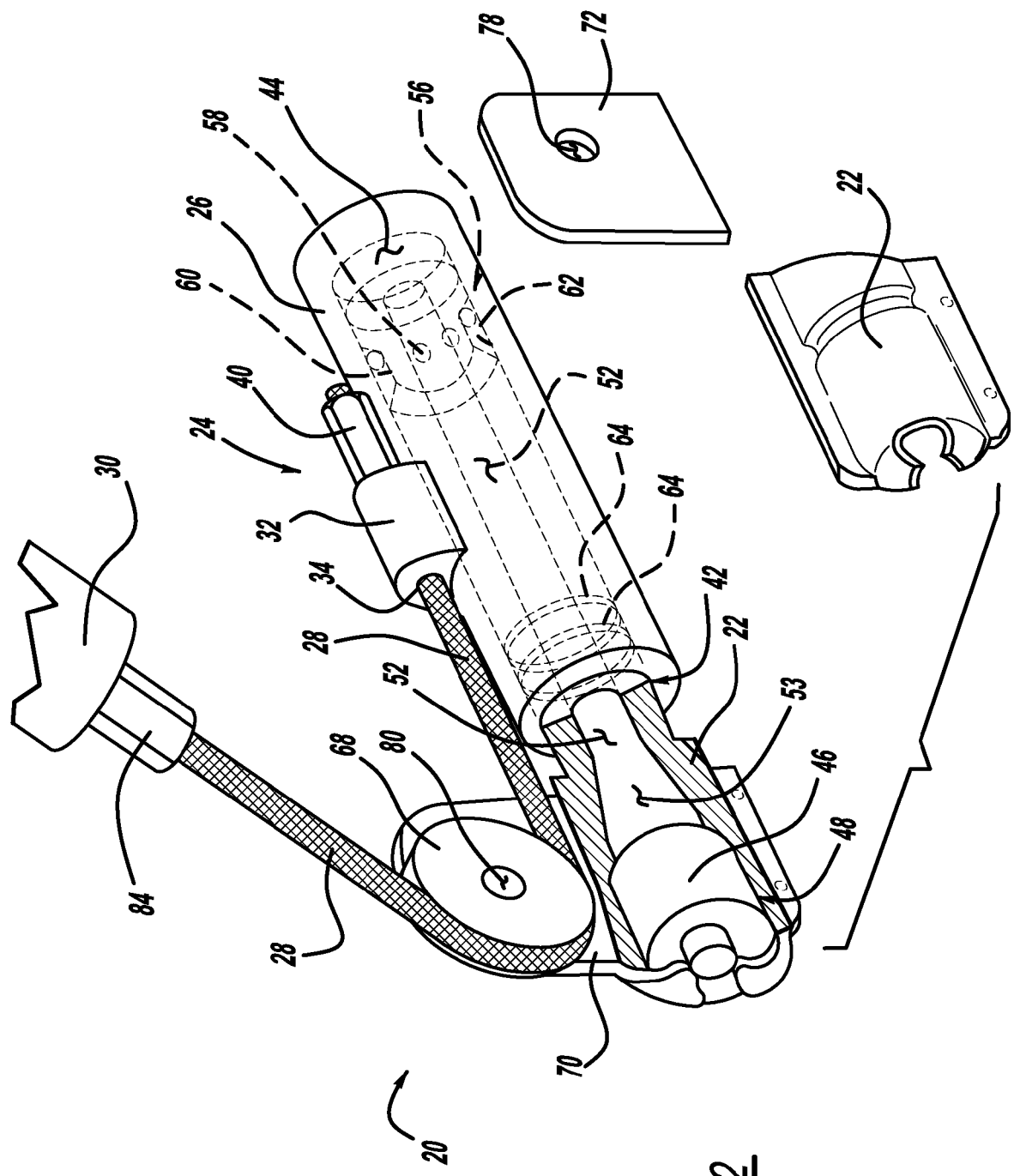
FIG. 2 is a partially exploded perspective view of the pretensioner of FIG. 1.

In one example, the gas generator 46 may deliver gas to the expanding chamber 44 as shown in FIGS. 1 and 2. The gas generator 46 is retained within a mounting cavity 48 within the main housing 22, at a proximal end 50 of the main housing 22. It may be retained by a retaining feature, such as a snap ring, staking, or criming, or it may be retained by features or flanges of the main housing (not shown), by way of example. The main housing 22 forms a hollow portion or passageway 52, such as a gas port, that passes through its length, extending from the cavity 48 and gas generator 46 to the distal end 54 of the main housing 22. The passageway 52 is open at the distal end 54 and communicates with bore 42 of the stroking housing 26. The passageway 52 is generally coaxially aligned with the cavity 48 and gas generator 46. The cavity 48 and the gas generator 46 communicate with the passageway 52 to allow gas to flow from the gas generator 46 to the expanding chamber 44 and into the bore 42 of the stroking housing 26. The passageway 52 may have a diameter that is less than the radius of the main housing 22, as shown in FIGS. 1 and 2, to minimize the amount of gas needed to pressurize the expanding chamber 44. In this example, a tapered or conical inner chamber 53 located between and coaxially aligned with the cavity 48 and the passageway 52 carries gas from the gas generator 46 to the narrow passageway 52.

The gas generator 46 may be a pyrotechnic microgas generator. It may be a small cylindrical component that is used to pyrotechnically produce an expanding gas in response to a firing signal carried by an electrical firing line (not shown). More particularly, when an electrical signal is sent to the gas generator 46, pyrotechnic material is ignited with the gas generator 46, which produces gas that bursts a weak or thin portion 47 of the gas generator 46 upon pressurization of the inside of the gas generator 46. Once the thin portion 47 is burst, the gas escapes from the gas generator 46 and into the inner chamber 53 of the main housing 22 and then into the passageway 52 and chamber 44. Other types of combustible material could also or alternatively be used, without falling beyond the spirit and scope of the present invention.

The main housing 22 is adapted to be fixed to the motor vehicle structure and remain stationary upon deployment of the gas generator 46. For example, the main housing 22 may be fixed to the vehicle structure using a fastener inserted through bores and/or flanges, or any other suitable means, as one having ordinary skill in the art would understand. In some forms of the invention, the main housing 22 may be fixed to the vehicle through a hole 80 in a guide feature 70 that is fixed to the main housing 22. However, it should be understand that the main housing 22 may be fixed to the vehicle in any other suitable way, without falling beyond the spirit and scope of the present invention.

The main housing 22 is provided with means for preventing the stroking housing 26 from moving in a reverse direction after actuation. For this function, a series of balls 58 is loaded into position surrounding a conical section 60 of the main housing 22. The balls 58 are located between the conical section 60 on the outer surface of the main housing 22 and an inner surface 62 of the stroking housing 26. In the event that the stroking housing 26 is driven in the right-hand direction during actuation (as the orientation of the pretensioner 20 is shown in FIG. 1), forces urging the stroking housing 26 to move in the left-hand direction would cause the balls 58 to become jammed or wedged between the surface of conical section 60 of the main housing 22 and the inner surface 62 of the stroking housing 26. This acts as a "one-way clutch" 56 preventing "backdriving" of pretensioner 20 after it is actuated. In other words, the one-way clutch 56 is disposed within the stroking housing 26 and is configured to permit movement of the stroking housing 26 along the main housing 22 in an outward direction while preventing movement of the stroking housing 26 in an opposed direction. The bearings 58, the conical section 60 of the exterior surface, and the inner surface 62 cooperate to permit movement of the stroking housing 26 in the outward direction and prevent movement of the stroking housing 26 in the opposed direction.

One or more seals 64 for gas retention are positioned around the exterior side 60 of the main housing 22, located between the main housing 22 and the stroking housing 26. These seals 64 seal the expanding chamber 44 and substantially prevent gas from leaking out of the open end 66 of the bore 42 of the stroking housing 26.

The cable 28 is routed from the cable stop 40 at one end of the cable 28, through the aperture 36 of the projection 32, and generally parallel to the stroking housing 26 and the main housing 22. The cable 28 is further routed around a guide 68, which may be a round portion, of a cantilevered guide feature 70 extending from the main housing 22. The guide 68 may be a stationary pulley or a non-stationary pulley, by way of example, and it may form an outer perimeter groove for guiding the cable 28. The guide feature 70 is used to contact and guide the flexible cable 28 around an arc for application in the vehicle, but it should be understood that the guide feature 70 could have various shapes, and not all vehicle applications require the cable 28 to be routed around a guide 68.

Referring to FIGS. 2-4, a guide plate 72 is fixed adjacent to the guide feature 70, and the guide plate 72 and guide feature 70 cooperate to form a channel 74 through which the cable 28 passes. The cable 28 extends through the channel 74 and wraps around the guide 68 of the guide feature 70. The guide plate 72 may be fixed to the guide feature 70 with a fastener 76, such as a threaded shank, or any other suitable means, such as a mechanical interfit, by way of example. The fastener 76 is inserted through a hole 78, such as a bore, in the guide plate 72 and a matching hole 80, such as a bore, in the guide feature 70. In some embodiments, the guide 68 of the guide feature 70 may be detached from the guide feature 70 before assembly, and may be fixed to the guide feature 70 with the fastener 76 or other means.

In some variations, the guide plate 72 may be fixed to the guide feature 70 only temporarily until the cable 28 and pretensioner 20 are torqued into position in the vehicle. A speed nut 82 or other low cost retention device may be applied to the fastener 76. Once installed into position, the cable 28 will remain tightly wrapped around the guide 68 of the guide feature 70, and will slide along the guide 68 when the pretensioner is activated, if the guide 68 is stationary. If the guide 68 is provided as a movable pulley, then the pulley will roll with the cable 28 against it when the pretensioner 20 is actuated.

The routing of the cable 28 continues from the guide feature 70 to a fastening feature 84 that connects it to a buckle 30 or another seat belt system component, such as a belt anchor or guide loop, depending on the desired vehicle application.

The cable 28 remains free from contact with the main housing 22 and the gas generator 46; it is secured to the cable stop 40 which is located outside of the main housing 22 and the stroking housing 26. Therefore, the linear pretensioner 20 remains free of leak paths adjacent the cable 28. The pretensioner 20 also remains free of leak paths through the main housing 22.

The main housing 22 and stroking housing 26 may be formed of aluminum, steel, or any other suitable material. The housings could be formed by a die cast process or any other suitable means. For example, if steel tube(s) are used, the tube(s) could be formed by casting, extrusion, or formed of seam welded sheet stock.

When the motor vehicle occupant restraint system calls for actuation of the pretensioner 20, a firing signal is sent to gas generator 46 which pyrotechnically generates a rapidly expanding gas that pressurizes the expanding chamber 44 between the distal end 54 of the main housing 22 and within the bore 42 of the stroking housing 26. This forces the stroking housing 26 to move axially in the right-hand direction to stroke along the main housing 22. The length of cable 28 may be chosen such that the stroking housing 26 will not stroke so far as to allow the main housing 22 to escape from the bore 42 of the stroking housing 26 after actuation, or other mechanical features can be provided to limit the maximum stroke of the stroking housing 26, such as putting a bead or other feature along the length of cable 28 that will stop the cable 28 from advances once the bead strikes the guide feature 70, or putting in a mechanical positive stop feature to limit the stroke length, which will be described in further detail below. A trim plate or other cover may be provided over the open space in which the stroking housing 26 will advance (on the right-hand side of the pretensioner 20 in the orientation of FIG. 1).

Forcible motion of the stroking housing 26 pulls the cable 28 around the guide 68 of the guide feature 70, which pulls on seat belt buckle 30 or a seat belt system component such as a webbing guide loop, depending on the desired application. This action provides the pretensioning displacement for the belt system, desired for enhancing belt restraint system performance.

Figure 5A:
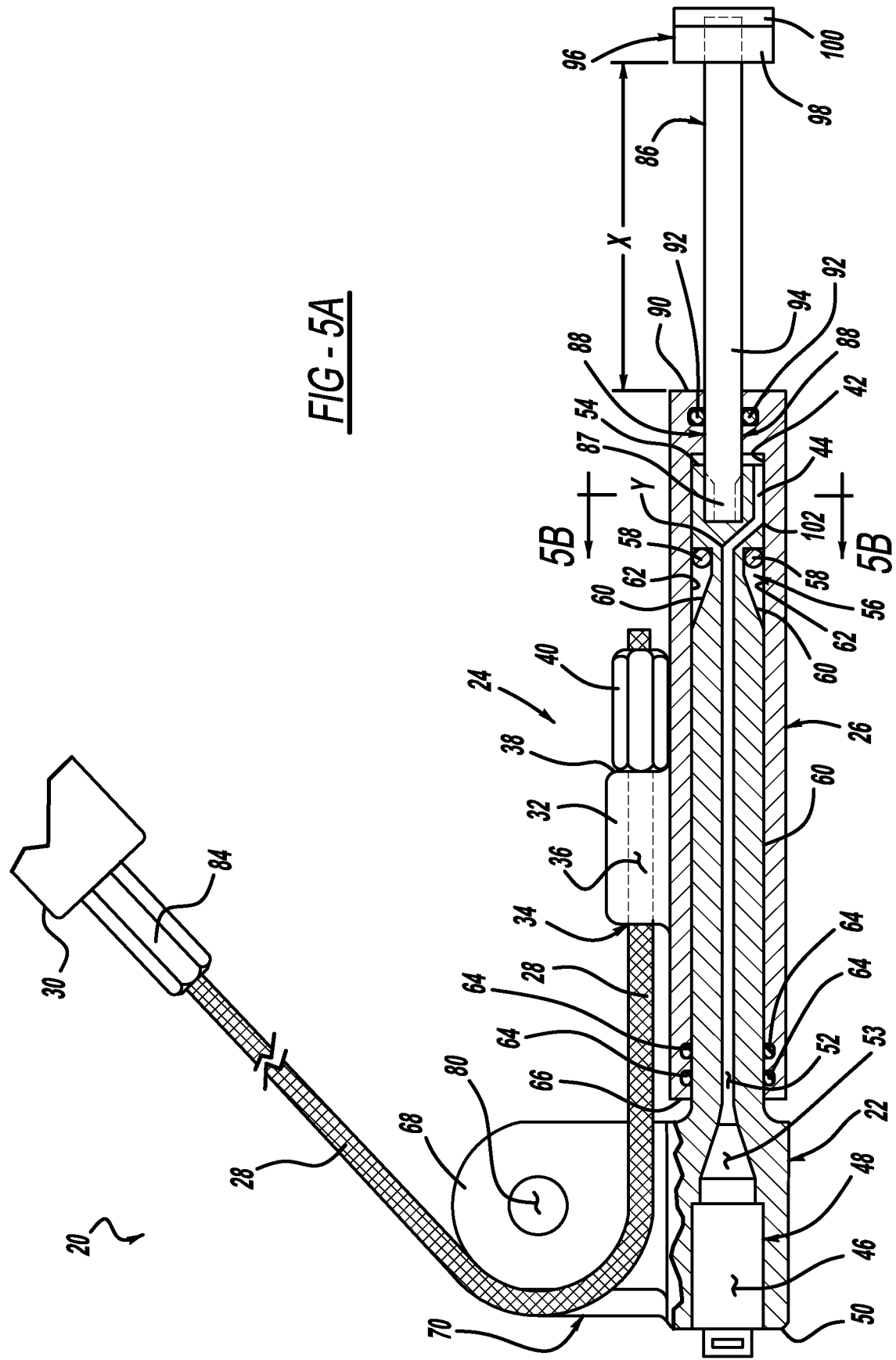
FIG. 5A is a side view of a pretensioner in accordance with the principles of the present invention, with the pretensioner partially cut away to show a side cross-sectional view, the pretensioner including a mechanical positive stop feature.

With reference now to FIGS. 5A and 5B, the pretensioner 20 is shown with an additional feature for limiting the stroke length of the stroking housing 26 along the main housing 22. A mechanical positive stop feature 86 is secured to the main housing 22 near the distal end 54 of the main housing 22 at a secured portion 87 of the mechanical positive stop feature 86. The mechanical positive stop feature 86 could be threaded and screwed into the main housing 22, or it could be secured in any other suitable manner.

The mechanical positive stop feature 86 passes through an aperture 88 at the distal end 90 of the stroking housing 26. Seals 92 surround the positive mechanical stop feature 86, between the shank 94 of the mechanical positive stop feature 86 and the stroking housing 26, to prevent gas from leaking through the aperture 88 in the stroking housing 26 through which the mechanical positive stop feature 86 passes. The seals 92 may be substantially similar to the seals 64 positioned between the main housing 22 and the stroking housing 26.

Since the mechanical positive stop feature 86 is secured to the main housing 22, it will remain stationary as the main housing remains stationary upon deployment of the gas generator 46. Upon deployment of the gas generator 46, the stroking housing 26 will advance to in the right-hand outer direction (in the orientation of the pretensioner 20 shown in FIG. 5A), and it will be prevented from stroking beyond the desired stroking length because it will run into the end stop 96 located on the positive mechanical stop feature 86. For example, the stroking housing 26 is prevented by the end stop 96 from traveling beyond the maximum stroking length X in FIG. 5A. The maximum stroke can be adjusted by varying the length X, in other words, lengthening or shortening the shank 94 or threading the secured portion 87 farther into the main housing 22.

The stop feature 86 may also ensure that the area needed to actuate the pretensioner 20 is free of obstructions. For example, the stop feature 86 extends from the right-hand side of the pretensioner 20, as shown in the orientation of FIG. 5A, occupying space to the right of the main housing 22, such that the stroke length that the stroking housing 26 will travel is occupied by the stop feature 86. In other words, the stop feature 86 occupies the space in which the stroking housing 22 will travel, so that other vehicle components will not be installed in the same space, and the pretensioner 20 will not be installed too closely to another panel, wall, or component within the vehicle.

The end stop 96 could include a deceleration damper pad 98, such as a urethane pad, secured to the shank 94 of the mechanical positive stop feature 86. The damper pad 98 could be secured to the shank 94 with a fastener head 100, or by any other suitable means, without falling beyond the spirit and scope of the present invention.

The gas port 52 in the main housing 22 turns at point Y in the main housing 22 to accommodate the secured portion 87 of the mechanical positive stop feature 86. The gas port 52 communicates with the bore 42 of the stroking housing 26 near or at an outer exterior edge 102 of the main housing 22. As such, gas generated by the gas generator 46 flows into the inner chamber 53, into the passageway 52, around the bend in the passageway 52 at point Y, and into the bore 42 of the stroking housing 26 near the exterior edge 102 of the main housing 22 to pressurize the expanding chamber 44.

Figure 6:
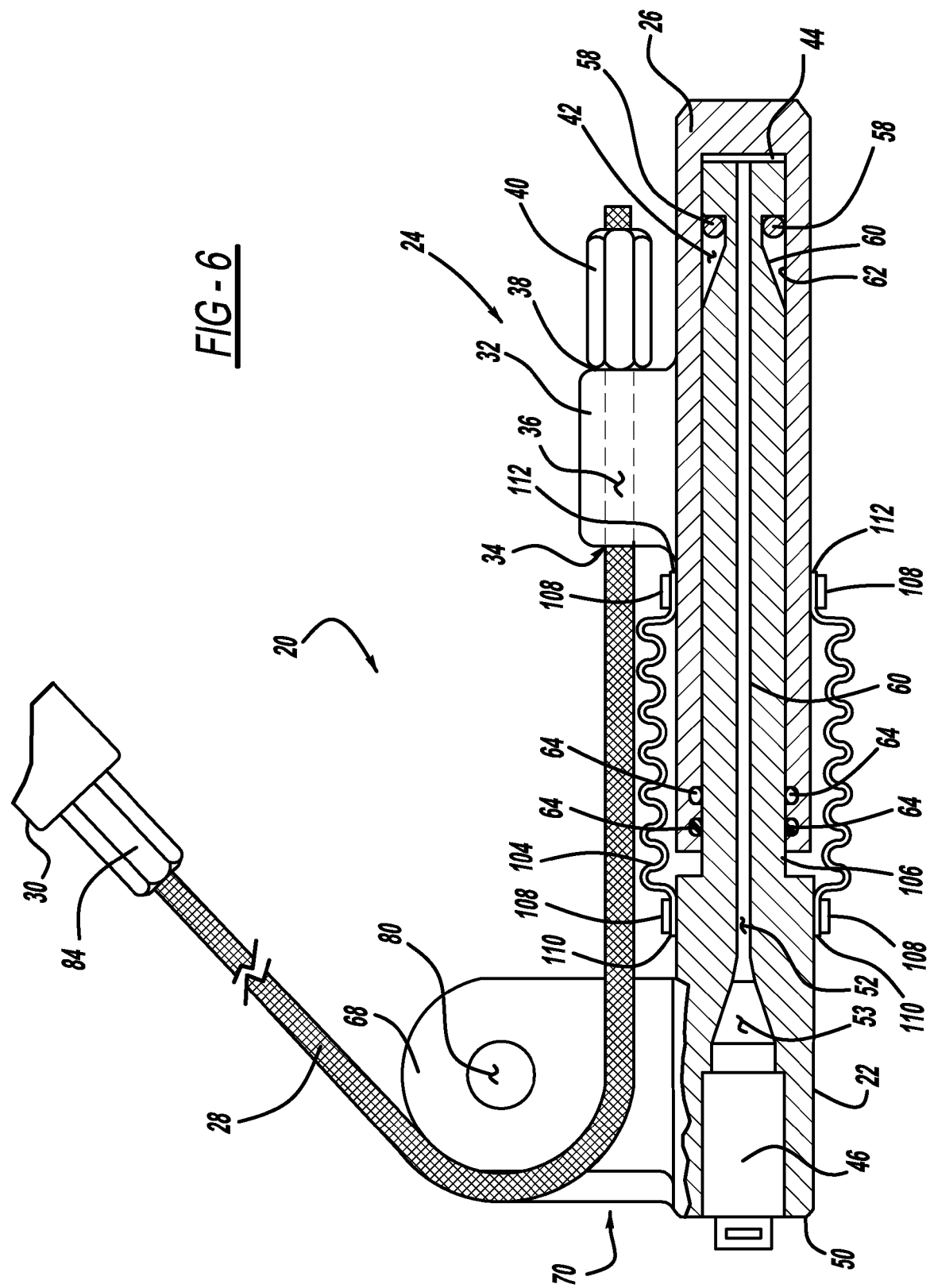
FIG. 6 is a side view of a pretensioner in accordance with the principles of the present invention, with the pretensioner partially cut away to show a side cross-sectional view, the pretensioner including a cover extending between a main housing and a stroking housing.

Now referring to FIG. 6, the pretensioner 20 is shown having a cover or boot 104 for hiding the piston-like portion 106 of the main housing 22 that becomes exposed as the stroking housing 26 advances upon actuation of the gas generator 46. The cover 104 may be flexible and elastomeric, and may have a convoluted or bellows surface as illustrated in FIG. 6, however, it should be understood that the cover 104 could have other configurations or shapes without falling beyond the spirit and scope of the present invention. The cover 104 is secured with clamping features 108, or other suitable fastening means, to the main housing 22 at a proximal end 110 and to the stroking housing 26 at a distal end 112. The protective cover 104 allows relative movement between the main housing 22 and the stroking housing 26.

Figure 7:
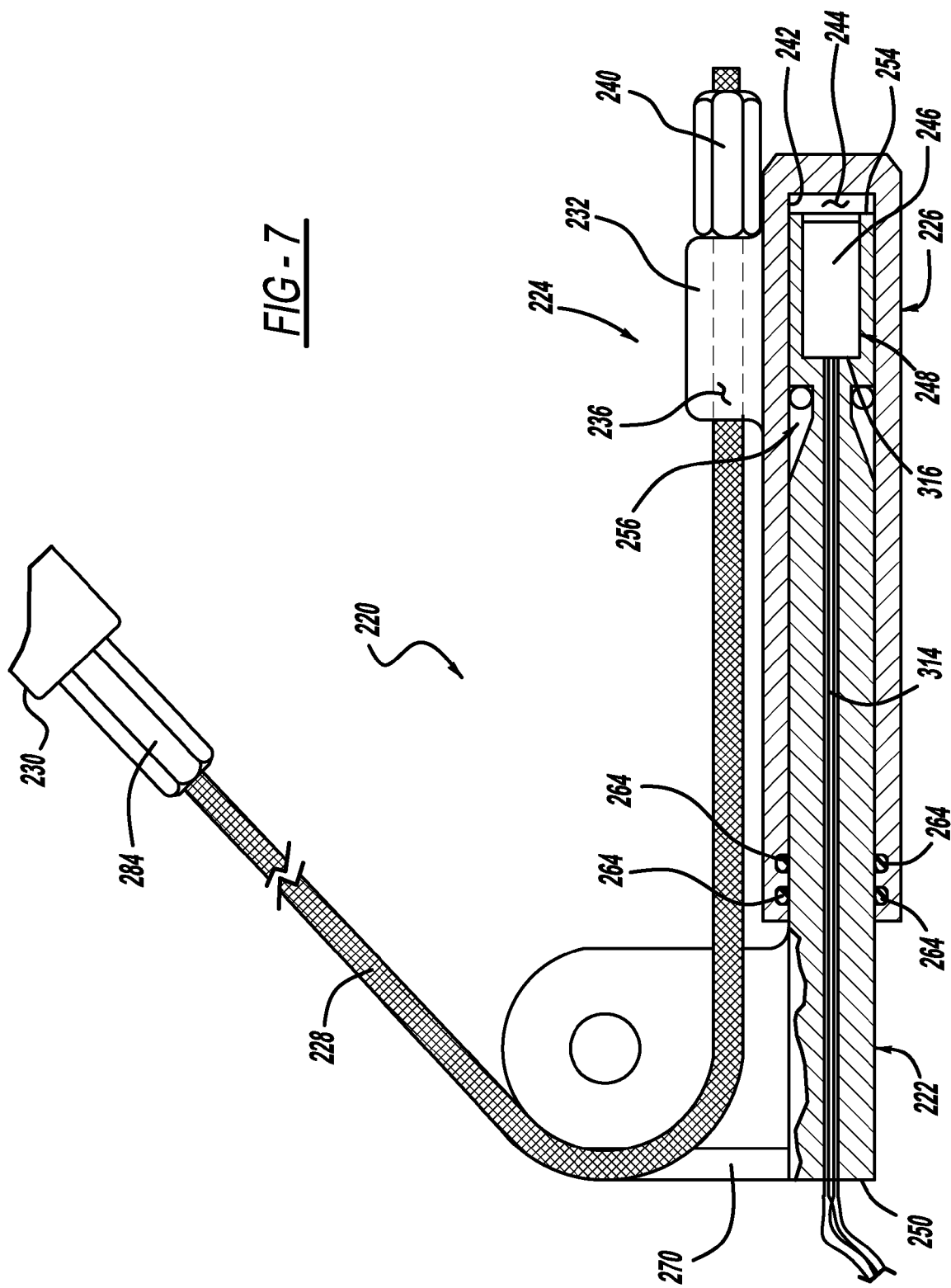
FIG. 7 is a side view of another pretensioner in accordance with the principles of the present invention, with the pretensioner partially cut away to show a side cross-sectional view.

Referring now to FIG. 7, another example of a pretensioner is illustrated at 220. Like the pretensioner of FIGS. 1-6, the pretensioner 220 shown in FIG. 7 has a main housing 222 and a stroking housing and cable assembly 224. The stroking housing and cable assembly 224 is substantially similar to the stroking housing of FIGS. 1-6, and the description with respect to those figures is herein incorporated by reference. For example, the stroking housing and cable assembly 224 includes a stroking housing 226 telescopically overfitting the main housing 222, a cable 228 coupled to the stroking housing 226, a projection 232 cooperating with a cable stop 240 to secure the cable 228 through the aperture 236 of the projection 232 to the stroking housing 226, and a buckle 230 and fastening feature 284 coupled to the cable 228.

The main housing 222 is fixed to the vehicle and is slid within the bore 242 of the stroking housing 226, and each of the main housing 222 and stroking housing 226 are formed generally as right circular cylinders, as hereinbefore described with respect to FIGS. 1-6. Likewise, the housings 222, 226 form an expanding chamber 244, which expands upon actuation of a gas generator 246, as hereinbefore described.

In this example, the gas generator 246 is located in a cavity 248 at a distal end 254 of the main housing 222 adjacent to the expanding chamber 244. Electrical firing lines 314, which are configured to transmit a firing signal to the gas generator 246, extend from an inside end 316 of the gas generator 246 and through the length of the main housing 222 to a proximal end 250 of the main housing 222. A gas port or passageway formed along the length of the main housing 222 is not necessary because the gas generator 246 fires at the distal end 254 of the main housing 222 into the bore 242 of the stroking housing 26 and pressurizes and expands the expanding chamber 244 of the pretensioner 220.

Like the pretensioner 20 described in FIGS. 1-6, the pretensioner 220 of FIG. 7 has a one-way clutch 256, seals 264, and a guide feature 270, which are substantially similar to the one-way clutch, seals, and guide feature described above, and the discussion of same is herein incorporated by reference.

Figure 8:
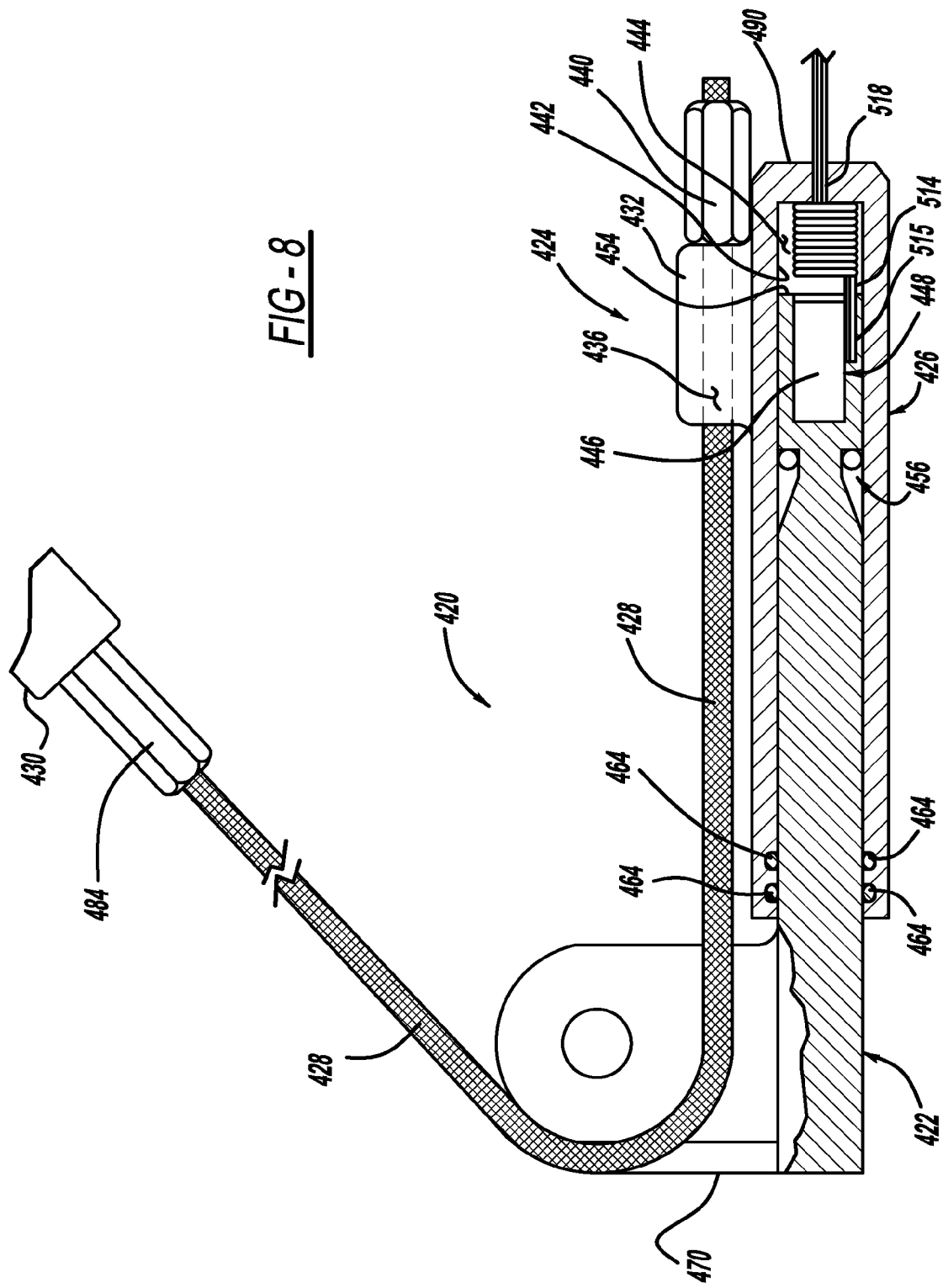
FIG. 8 is a side view of yet another pretensioner in accordance with the principles of the present invention, with the pretensioner partially cut away to show a side cross-sectional view.

Now with reference to FIG. 8, another example of a pretensioner 420 within the spirit and scope of the present invention is shown. Like the pretensioners described above, the pretensioner 420 has a main housing 422 and a stroking housing and cable assembly 424. Except for the differences described with reference to FIG. 9, the stroking housing and cable assembly 424 is substantially similar to the stroking housing of FIGS. 1-6, and the description with respect to those figures is herein incorporated by reference. For example, the stroking housing and cable assembly 424 includes a stroking housing 426 telescopically overfitting the main housing 422, a cable 428, a projection 432 cooperating with a cable stop 440 to secure the cable 428 through the aperture 436 to the stroking housing 426, and a fastening feature 484 and buckle 430 coupled to the cable 428. Further, the pretensioner 420 has a one-way clutch 456, seals 464, and a guide feature 470, which are substantially similar to the one-way clutch, seals, and guide feature described above, and the discussion of same is herein incorporated by reference.

The main housing 422 is fixed to the vehicle and is slid within the bore 442 of the stroking housing 426, and each of the main housing 422 and stroking housing 426 are formed generally as right circular cylinders, as hereinbefore described with respect to FIGS. 1-7. Likewise, the housings 422, 426 form an expanding chamber 444, which expands upon actuation of a gas generator 446, as hereinbefore described.

In this example, the gas generator 446 is located in a cavity 448 at a distal end 454 of the main housing 422. Electrical firing lines 514, which are operable to transmit a firing signal to the gas generator 446, extend from the gas generator 446, through an aperture 515 in the main housing 422, into the bore 442 of the stroking housing 426, and out of the stroking housing 426 through an opening 518 at the distal end 490 of the stroking housing 426. The opening 518 is sized to tightly fit around the firing lines 514 and minimize leaking through the opening 518 of the gas generated by the gas generator 446. One or more seals (not shown) may also be provided around the firing lines 514 within the opening 518 to seal the expanding chamber 444.

Some of the length of the firing lines 514 may be accumulated within the bore 442 as shown in FIG. 8, such that the firing lines 514 have excess length, or slack, that allows the stroking housing 426 to advance outwardly to the right without shearing or breaking the firing lines 514. In the alternative, the firing lines 514 could be sized to shear or break upon advancement of the stroking housing 426, as the gas generator 446 will already have been activated by the time the stroking housing 426 moves outwardly to the right (as shown in FIG. 8), and there is no longer a need for the firing lines 514 to remain intact.

In this example, a gas port or passageway along the length of the main housing 422 is not necessary because the gas generator 446 fires at the distal end 454 of the main housing 422 into the bore 442 and expands the expanding chamber 444 of the pretensioner 420. It is also not necessary to provide an aperture for the firing lines 514 to pass through the length of the main housing 422 (such as the aperture through which the electrical firing lines 314 of FIG. 7 pass), because the main housing 422 has a shorter aperture 515 through which the firing lines 514 pass into the bore 442 of the stroking housing 426, and the firing lines 514 further extend through the opening 518 of the stroking housing 426.

Figure 9:
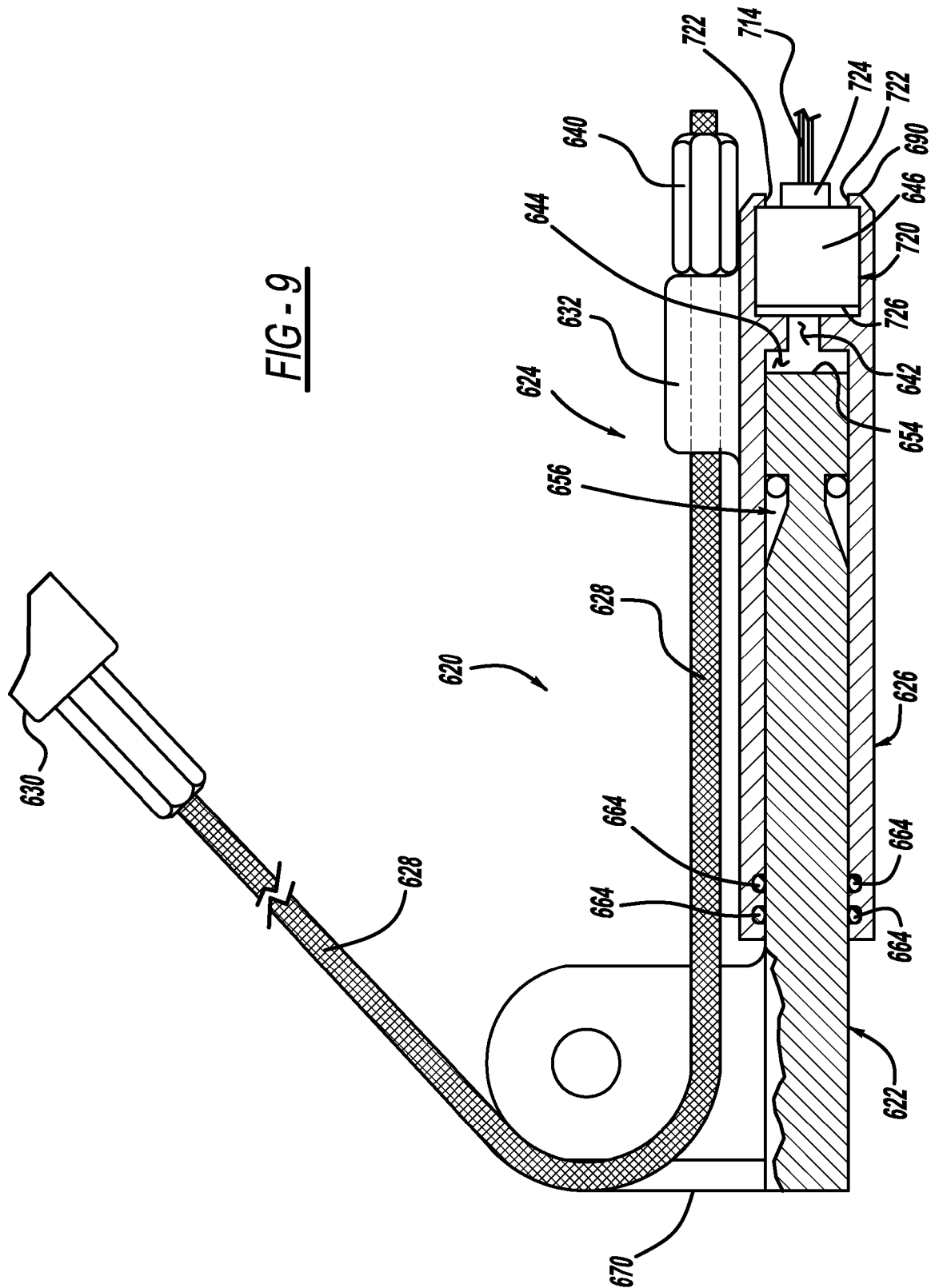
FIG. 9 is a side view of still another pretensioner in accordance with the principles of the present invention, with the pretensioner partially cut away to show a side cross-sectional view.

Now with reference to FIG. 9, another pretensioner is shown generally at 620. Like the pretensioners described above, the pretensioner 620 has a main housing 622 adapted to be fixed to the vehicle and a stroking housing and cable assembly 624. The stroking housing and cable assembly 624 has a cable 628 coupled to a stroking housing 626. Like the pretensioners described above, the stroking housing 626 is configured to advance outwardly in the right-hand direction (in the orientation shown in FIG. 9) upon actuation of a gas generator 646 and tension the cable 628 and the buckle 630. Further, the pretensioner 620 has a one-way clutch 656, seals 664, and a guide feature 670 substantially similar to those described above.

The stroking housing 626 is telescopically fitted over the main housing 622. The stroking housing 626 has a projection 632 that cooperates with a cable stop 640 to fix the cable 628 to the stroking housing 626, substantially similar to the projections and cable stops described above, and the descriptions of those are herein incorporated by reference.

The gas generator 646 is located in a cavity 720 of the stroking housing 626 and moves with the stroking housing 626 upon deployment of the gas generator 646. The gas generator 646 may be staked into the cavity 720 and flanges 722 may hold the gas generator 646 in the cavity 720, or the gas generator 646 may be retained in any other suitable manner, such as the other manners described herein, without falling beyond the spirit and scope of the present invention. An exposed end 724 of the gas generator 646 is exposed at the distal end 690 of the stroking housing 626, and firing lines 714 operable to bring an electrical signal to the gas generator 646 extend from the exposed end 724.

The gas generator 646 communicates with the bore 642 of the stroking housing 626 at a proximal end 726 of the gas generator 646. Upon actuation, gas is released from the gas generator 646 and pressurizes the expanding chamber 644 formed by the bore 642 of the stroking housing 626 and the distal end 654 of the main housing 622. Upon being pressurized, the expanding chamber 644 expands, which results in the stroking housing 626 advancing in the outward, right-hand direction (in the orientation shown in FIG. 9), because the main housing 622 is fixed to the motor vehicle.

Figure 10:
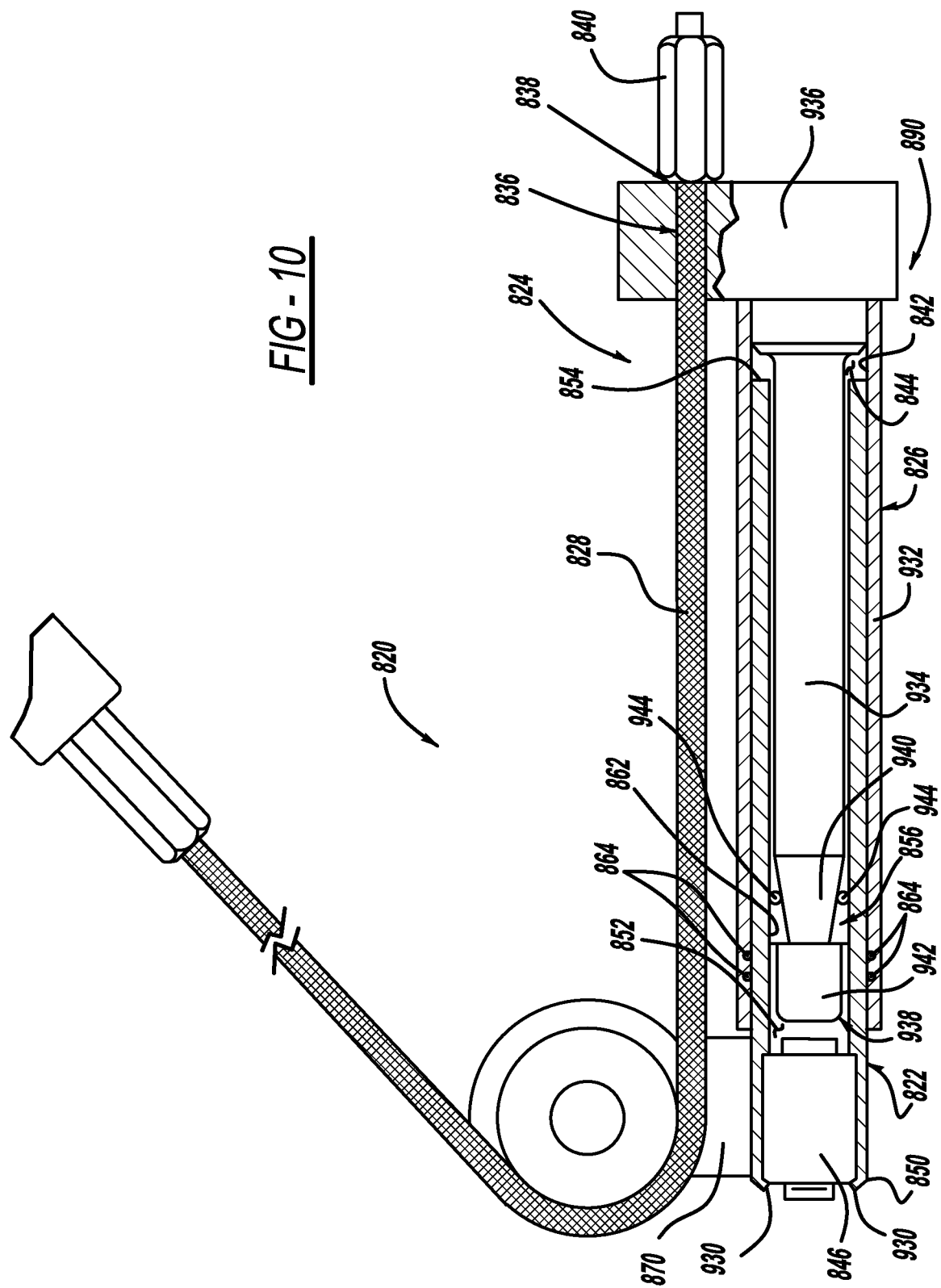
FIG. 10 is a side view of still another pretensioner in accordance with the principles of the present invention, with the pretensioner partially cut away to show a side cross-sectional view.

Now with reference to FIG. 10, another linear pretensioner is shown at 820. Like the pretensioners described above, the pretensioner 820 includes a main housing 822 and a stroking housing and cable assembly 824, which includes a cable 828 coupled to a stroking housing 826 and to a belt restraint component (not shown). The main housing 822 is adapted to be fixed to the motor vehicle and has a guide feature 870 to guide the cable 828, which may be similar to the guide features described above. The guide feature 870 may be spot welded to the main housing 822.

The stroking housing 826 forms a bore 842 through its center and is slid over an open distal end 854 of the main housing 822, such that the stroking housing 826 fits telescopically over the main housing 822 with a sliding fit, substantially the same as in the pretensioners described above. A gas generator 846 is positioned at a proximal end 850 of the main housing and is secured therein with flanges 930. It should be understood, however, that the gas generator 846 could be retained within the main housing 822, or within the stroking housing 826, in any other suitable manner, without falling beyond the spirit and scope of the present invention.

The gas generator 846 delivers gas to an inside bore 852 of the main housing 822, which cooperates with the bore 842 of the stroking housing 826 to form an expanding chamber 844. The inside bore 852 passes through the length of the main housing 822, extending from the gas generator 846 to the distal end 854 of the main housing 822. The inside bore 852 is generally coaxially aligned with the gas generator 846. The gas generator 846 communicates with the inside bore 852 to allow gas to flow from the gas generator 846 to the expanding chamber 844 and into the bore 842 of the stroking housing 826.

The stroking housing 826 includes an outer tubular portion 932 and an inner rod 934. The rod 934 and the outer tubular portion 932 are secured to an adapter 936, which seals the bore 842 at the distal end 890 of the stroking housing 826. The rod 934 includes a conical section 940 attached to a plunger 942 at the free end 938 of the rod 934.

Open space exists between the rod 934 and the inner surface 862 of the inside bore 852; likewise, open space exists between the conical section 940 and the inner surface 862 and between the plunger 942 and the inner surface 862. In other words, the rod 934, plunger 942, and conical section 940 remain free from contact with the inner surface 862 of the inside bore 852 of the main housing 822. The open space allows gas to flow from the gas generator 846 past the plunger 942, the conical section 940, most of the length of the rod 934, and past the distal end 854 of the main housing 822 to pressurize the expanding chamber 844, forcing the stroking housing 826 to move axially in the right-hand direction (as shown in the orientation of FIG. 10.) The rod 934 occupies a portion of the air space in the expanding chamber 844 so that the gas generator 846 need not be sized as largely as would be necessary if no rod 934 was present.

The conical section 940 cooperates with balls 944 to form a one-way clutch 856 substantially similar to the one-way clutches described above. The conical section 940 tapers in the opposite direction from the one-way clutch of FIG. 1, however, because of its location between the inside bore 852 of the main housing 822 and the conical section 940 attached to the rod 934. The one-way clutch 856 allows the rod 934 to move in the right-hand direction (as shown in the orientation of FIG. 10) within the inside bore 852, but it prevents the rod 934 (and with it, the stroking housing 826) from moving in the left-hand direction.

The cable 828 is fixed to the stroking housing 826, so that when the stroking housing 826 advances in the right-hand direction, tension will be exerted on the cable 828 and the seat belt component. In this example, the cable 828 is fixed to the stroking housing 826 via the adapter 936. The cable 828 is inserted through an aperture 836 in the adapter 936 and fixed to a cable stop 840 on the distal side 838 of the aperture 836 to prevent the cable 828 from exiting back through the aperture 836. Accordingly, the cable 828 remains free from contact with the main housing 822 and the gas generator 846, as the cable stop 840 and adapter 936 are located outside of the main housing 822 and the stroking housing 826.

Seals 864 substantially seal the expanding chamber 844. Therefore, when the motor vehicle occupant restraint system calls for actuation of the pretensioner 820, a firing signal is sent to gas generator 846 which pyrotechnically generates a rapidly expanding gas that pressurizes the expanding chamber 844. This forces the stroking housing 826 to move axially in the right-hand direction to stroke along the main housing 822, along with the rod 934 and adapter 936. Forcible motion of the stroking housing 826 tensions the cable 828 and pulls on a seat belt system component.

Figure 11:
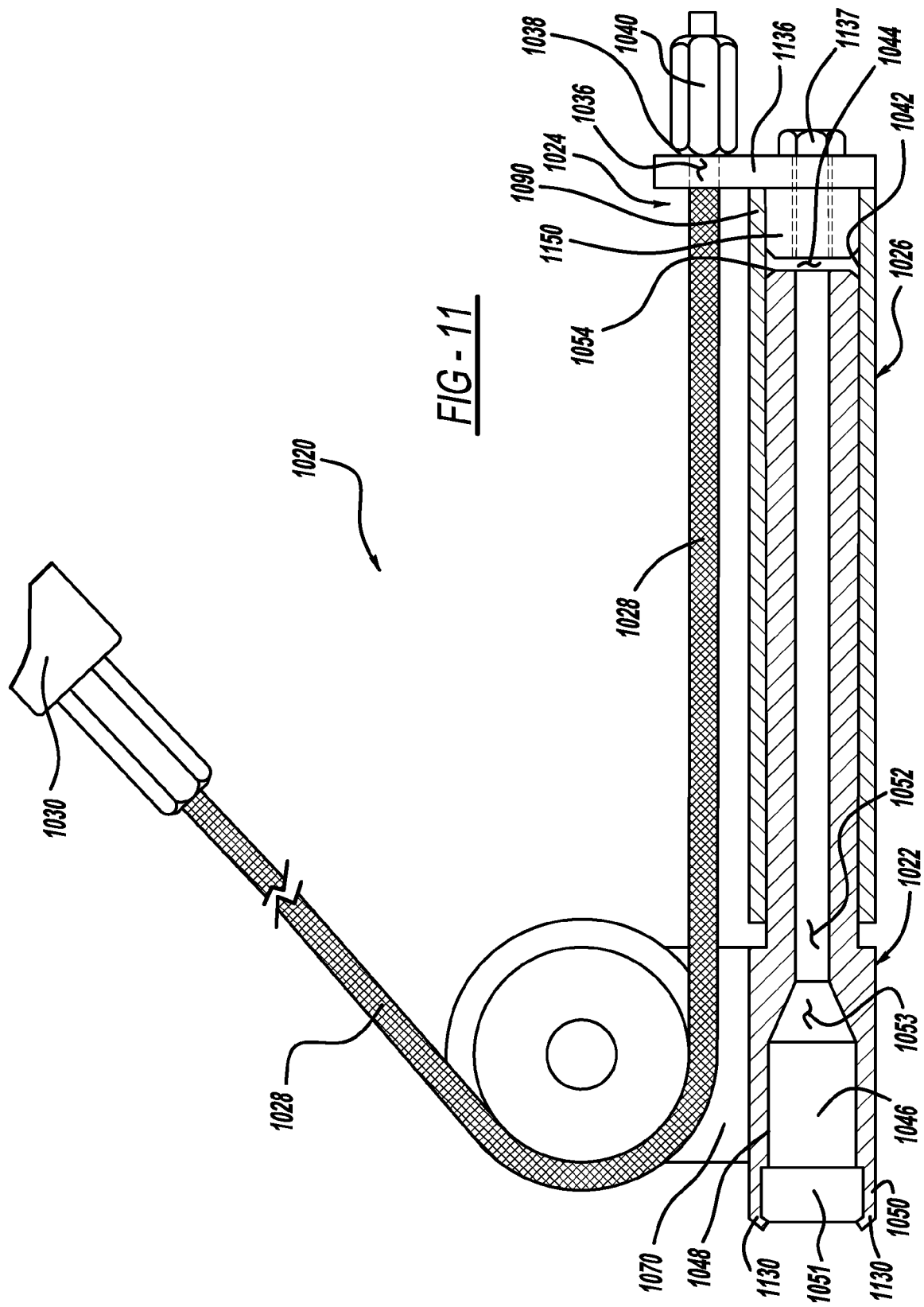
FIG. 11 is a side view of still another pretensioner in accordance with the principles of the present invention, with the pretensioner partially cut away to show a side cross-sectional view.

Now with reference to FIG. 11, another linear pretensioner is shown at 1020. Like the pretensioners described above, the pretensioner 1020 includes a main housing 1022 and a stroking housing and cable assembly 1024, which includes a cable 1028 coupled to a stroking housing 1026 and to a belt restraint component 1030. The main housing 1022 is adapted to be fixed to the motor vehicle and has a guide feature 1070 to guide the cable 1028, which may be similar to the guide features described above.

The stroking housing 1026 forms a bore 1042 through its center and is slid over an open distal end 1054 of the main housing 1022, such that the stroking housing 1026 fits telescopically over the main housing 1022 with a sliding fit, substantially the same as in the pretensioners described above. A gas generator 1046, which may be similar to the gas generators described above, is positioned within a cavity 1048 located at a proximal end 1050, opposite the distal end 1054, of the main housing 1022 and is secured therein with a stop 1051 and one or more flanges 1130. It should be understood, however, that the gas generator 1046 could be retained within the main housing 1022, or within the stroking housing 1026, in any other suitable manner, without falling beyond the spirit and scope of the present invention.

The main housing 1022 forms a hollow portion or passageway 1052, such as a gas port, that passes through its length, extending from the cavity 1048 and gas generator 1046 to the distal end 1054 of the main housing 1022. The passageway 1052 is open at the distal end 1054 and communicates with bore 1042 of the stroking housing 1026.

The passageway 1052 is generally coaxially aligned with the cavity 1048 and gas generator 1046. The cavity 1048 and the gas generator 1046 fluidly communicate with the passageway 1052 to allow gas to flow from the gas generator 1046 to the expanding chamber 1044 and into the bore 1042 of the stroking housing 1026. In this example, a conical inner chamber 1053 is located between and coaxially aligned with the cavity 1048 and the passageway 1052. The inner chamber 1053 carries gas from the gas generator 1046 to the narrower passageway 1052.

The stroking housing 1026 is secured to an adapter 1136, for example, by a threaded fastener 1137, which seals the bore 1042 at the distal end 1090 of the stroking housing 1026. In this example, the stroking housing 1026 has a grommet 1150 attached inside the bore 1042 at the distal end 1090 of the stroking housing 1026. The fastener 1137 attaches the adapter 1136 to the grommet 1150.

The cable 1028 is fixed to the stroking housing 1026, so that when the stroking housing 1026 advances in the right-hand direction, tension will be exerted on the cable 1028 and the seat belt component. In this example, the cable 1028 is fixed to the stroking housing 1026 via the adapter 1136. The cable 1028 is inserted through an aperture 1036 in the adapter 1136 and fixed to a cable stop 1040 on the distal side 1038 of the aperture 1036 to prevent the cable 1028 from exiting back through the aperture 1036. Accordingly, the cable 1028 remains free from contact with the main housing 1022 and the gas generator 1046, as the cable stop 1040 and adapter 1136 are located outside of the main housing 1022 and the stroking housing 1026.

The pretensioner 1020 may also have seals (not shown) located around the main housing 1022 within the bore 1042 of the stroking housing 1026, which may be similar to the seals described above. In addition, the pretensioner could have a one-way clutch (not shown), similar to the one-way clutches described above to allow the stroking housing 1026 to move in the right-hand direction (as shown in the orientation of FIG. 11), while preventing it from moving in the left-hand direction.

When the motor vehicle occupant restraint system calls for actuation of the pretensioner 1020, a firing signal is sent to the gas generator 1046 which pyrotechnically generates a rapidly expanding gas that pressurizes the expanding chamber 1044. This forces the stroking housing 1026 to move axially in the right-hand direction to stroke along the main housing 1022, along with the adapter 1136. Because the adapter 1136 is connected to the cable 1028, forcible motion of the stroking housing 1026 tensions the cable 1028 and pulls on a seat belt system component.

Now with reference to FIGS. 12 and 13, another linear pretensioner in accordance with the present invention is shown and is generally designated by reference number 1220. Sub-assemblies of the pretensioner 1220 include an outer housing 1222 and an inner housing and cable assembly 1224. The inner housing and cable assembly 1224 includes an inner housing 1226, a projection 1232, and a flexible cable 1228. The cable 1228 is coupled to the projection 1232, which is coupled to the inner housing 1226. The cable 1228 is also coupled to a belt restraint component 1230.

The projection 1232 extends from a distal end 1350 of the inner housing 1226. The cable 1228 is inserted through a first end 1234 of an aperture 1236 in the projection 1232 and extends through a second end 1238 of the aperture 1236. The cable 1228 is secured to a cable stop 1240 adjacent the second end 1238 of the aperture 1236 to retain the cable 1228 to the projection 1232 and prevent it from being retracted back through the aperture 1236. In this way, the projection 1232 is configured to assist with retaining the cable 1228 to the inner housing 1226. The cable stop 1240 prevents the cable 1228 from being pulled back through the aperture 1236 once the cable stop 1240 is installed. The cable 1228 may be secured to the cable stop 1240 by crimping or any other suitable means, without falling beyond the spirit and scope of the present invention.

It should be understood that the aperture 1236 and cable stop 1240 are merely examples of means for coupling the cable 1228 with the projection 1232 and inner housing 1226 within the spirit and scope of the present invention. Alternative means for coupling the cable 1228 with the projection 1232 and the inner housing 1226 could be used without falling beyond the spirit and scope of the present invention. For example, the cable 1228 could be fastened or secured to the projection 1232 or inner housing 1226 by glue, crimping, knot, of any other suitable means. Further, the projection 1232 is shown as a separate component from the inner housing 1226, however, in some embodiments, the projection 1232 could be integrally and/or unitarily formed with the inner housing 1226, such that the projection 1232 is merely an extension of the inner housing 1226 at its distal end 1350.

The outer housing 1222 forms a bore 1242 and is slid over a proximal end 1354 of the inner housing 1226. The inner housing 1226 is positioned in the bore 1242 of the outer housing 1222, such that the outer housing 1222 telescopically overfits the inner housing 1226 with a sliding fit. The outer housing 1222 may form a cross-sectional shape which is generally circular, with the inner housing 1226 forming a cross-sectional shape which corresponds with the shape of the outer housing 1222. In this example, the housings 1222, 1226 are generally formed as right circular cylinders. The inner housing 1226 includes a rod 1334 and a plunger 1348 located at a proximal end 1354 of the rod of the inner housing 1226, which are located inside the bore 1242 of the outer housing 1222 in a pre-deployment state of the pretensioner 1220 (in some embodiments, the plunger 1348 remains within the bore 1242 in a deployed state, as well as in a pre-deployment state; likewise, the rod 1334 may remain partially within the bore 1242 in the deployed state). The projection 1232 is located entirely outside of the bore 1242 of the outer housing 1222, in this embodiment.

The outer housing 1222 and the inner housing 1226 form an expanding chamber 1244 that enlarges when pressurized by a gas generator 1246. Upon activation, the gas generator 1246 pressurizes the expanding chamber 1244, which causes it to expand and drive the inner housing 1226 along the bore 1242 of the outer housing 1222 to exert tension on the cable 1228. As such, the distal end 1350 of the inner housing 1226 is driven away from the outer housing 1222, and a distal end portion 1351 of the inner housing 1226 is driven out of the bore 1242 of the outer housing 1222 to exert tension on the cable 1228. The distal end portion 1351 may include all or part of the rod 1334. It may also include all or part of the plunger 1348.

The gas generator 1246 maybe retained within a mounting cavity 1248 within the outer housing 1222, at a proximal end 1250 of the outer housing 1222. It may be retained by a retaining feature 1251, such as those described above, and/or it may be retained by features or flanges 1330, by way of example. However, it should be understood that the gas generator 1246 could be placed elsewhere, such as within the inner housing 1226, for example.

In this embodiment, the cavity 1248 communicates with the bore 1242 of the outer housing and is generally coaxially aligned with the bore 1242. Gas flows from the gas generator 1246 to the expanding chamber 1244 within the bore 1242 of the outer housing 1222. The gas generator 1246 may be a pyrotechnic microgas generator, as described above, which produces an expanding gas in response to a firing signal carried by a firing line (not shown). Once the gas escapes from the gas generator 1246 and into the expanding chamber 1244, the expanding chamber 1244 expands, causing the inner housing 1226 to travel within the bore 1242. In the orientation shown in FIG. 12, the inner housing 1226 travels in the right-hand direction and exerts tension on and pulls the cable 1228 in the right-hand direction.

The outer housing 1222 is adapted to be fixed to the motor vehicle structure and remain stationary upon deployment of the gas generator 1246. The outer housing 1222 may be fixed to the vehicle structure in any suitable way, such as the means described above, by way of example.

The pretensioner 1220 may include means for preventing the inner housing 1226 from moving in a reverse direction after actuation, such as a one-way clutch 1256, which may be similar to the one-way clutches described above. One or more seals 1264 for gas retention are positioned around the exterior side 1260 of the plunger 1348, located between the plunger 1348 and the inner surface 1262 of the outer housing 1222. The seals 1264 could also or alternatively be located around the piston rod 1334, between the piston rod 1334 and the inner surface 1262 of the outer housing 1222. These seals 1264 seal the expanding chamber 1244 and substantially prevent gas from leaking out of the bore 1242 of the outer housing 1222.

The cable 1228 is routed from the cable stop 1240 at one end of the cable 1228, through the aperture 1236 of the projection 1232, and generally parallel to the outer housing 1222 and the inner housing 1226. The cable 1228 is further routed around a guide 1268, which may be a round portion, of a cantilevered guide feature 1270 extending from the outer housing 1222. The guide 1268 may be a stationary pulley or a non-stationary pulley, by way of example, and it may form an outer perimeter groove (element 1274 in FIG. 13) for guiding the cable 1228. The guide feature 1270 is used to contact and guide the flexible cable 1228 around an arc for application in the vehicle, but it should be understood that the guide feature 1270 could have various shapes, and not all vehicle applications require the cable 1228 to be routed around a guide 1268.

The routing of the cable 1228 continues from the guide feature 1270 to a fastening feature 1284 that connects it to a buckle 1230 or another seat belt system component, such as a belt anchor or guide loop, depending on the desired vehicle application.

In some forms, the cable 1228 remains free from contact with the inner housing 1226 and the gas generator 1246; it is coupled with the projection 1232, which is located outside of the bore 1242 of the outer housing 1222. In other words, the cable 1228 is located entirely outside of the bore 1242 of the outer housing 1222. Therefore, the linear pretensioner 1220 remains free of leak paths adjacent the cable 1228. The pretensioner 1220 also remains free of leak paths through the inner housing 1226. In this example, the cable 1228 is routed adjacent to and generally parallel with the inner and outer housings 1226, 1222, and the cable 1228 is located entirely outside of the inner housing 1226, as well as the outer housing 1222.

The inner and outer housings 1226, 1222 may be formed of aluminum, steel, or any other suitable material, and also may be constructed by any suitable means, as described above with respect to the main and stroking housings.

When the motor vehicle occupant restraint system calls for actuation of the pretensioner 1220, a firing signal is sent to gas generator 1246 which pyrotechnically generates a rapidly expanding gas that pressurizes the expanding chamber 1244 between the plunger 1348 of the inner housing 1226 and the gas generator 1246, within the bore 1242 of the outer housing 1222. This forces the inner housing 1226 to move axially in the right-hand direction to stroke within the bore 1242 of the outer housing 1222. The length of cable 1228 may be chosen such that the inner housing 1226 will not stroke so far as to allow the inner housing 1226 to escape from the bore 1242 of the outer housing 1222 after actuation, or other mechanical features can be provided to limit the maximum stroke of the inner housing 1226, such as putting a bead or other feature along the length of cable 1228 that will stop the cable 1228 from advancing once the bead strikes a portion of the guide feature 1270, or putting in a mechanical positive stop feature to limit the stroke length, similar to the mechanical positive stop feature 86 shown and described above with respect to FIG. 5A.

Forcible motion of the inner housing 1226 pulls the cable 1228 around the guide 1268 of the guide feature 1270, which pulls on seat belt buckle 1230. This action provides the pretensioning displacement for the belt system, desired for enhancing belt restraint system performance.

Referring to FIG. 13, the pretensioner 1220 is shown from a proximal end. Therefore, the figure shows the proximal end 1250 of the outer housing 1222, the stop 1251 for the gas generator (not shown), and the flange 1330 to hold the stop 1251 and gas generator. In this example, the guide feature 1270 is a U-shaped bracket that extends along a front side 1271 and back side 1273 of the round guide 1268. The guide 1268 forms a groove or channel 1274 through which the cable 1228 passes. The cable 1228 extends through the channel 1274 and wraps around the guide 1268 of the guide feature 1270. A fastener (not shown) may be inserted through a hole 1280, such as a bore, in the guide feature 1270 to attach the pretensioner 1220 to the vehicle structure, in some embodiments. The U-shaped bracket may be formed of one or more components. For example, a guide plate substantially similar to the guide plate 72 shown and described in FIGS. 2-4 may be used to form the front side 1271 of the guide feature 1270.

Figure 16:
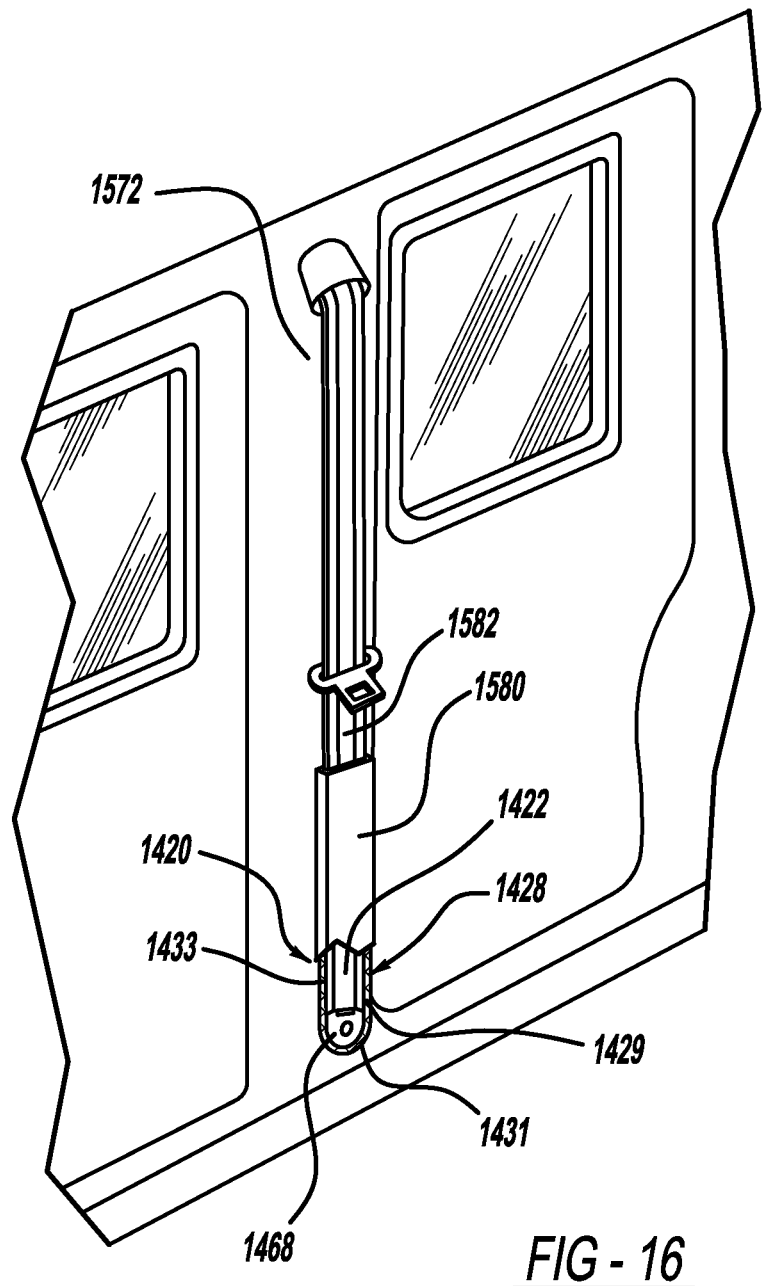
FIG. 16 is a perspective view of the pretensioner of FIGS. 14-15, installed in a vehicle and covered with the shroud, wherein the shroud is partially cut away to show the pretensioner.

Referring now with to FIGS. 14-16, another linear pretensioner in accordance with the present invention is shown and is generally designated by reference number 1420. The pretensioner 1420 includes an outer housing 1422 and an inner housing and cable assembly 1424. The inner housing and cable assembly 1424 includes an inner housing 1426, a projection 1432, and a flexible cable 1428. The cable 1428 is coupled to the projection 1432, which is coupled to the inner housing 1426. The cable 1428 is also coupled to a belt restraint component 1430. In some embodiments, the cable 1428 could be connected directly to the inner housing 1426, such that the projection 1432 is not needed.

The inner and outer housings 1426, 1422 may be formed of aluminum, steel, or any other suitable material, and also may be constructed by any suitable means, as described above with respect to the main and stroking housings.

The projection 1432 extends from a distal end 1550 of the inner housing 1426. In this embodiment, the cable 1428 is coupled to the projection 1432 by inserting the cable 1428 through a first end 1434 of an aperture 1436 in the projection 1432 and extending the cable 1428 through a second end 1438 of the aperture 1436. The cable 1428 is secured to a cable stop 1440 adjacent the second end 1438 of the aperture 1436, which may be a swedged anchor, for example, to retain the cable 1428 to the projection 1432 and prevent it from being retracted back through the aperture 1436. In this way, the projection 1432 is configured to assist with retaining the cable 1428 to the inner housing 1426. The cable stop 1440 prevents the cable 1428 from being pulled back through the aperture 1436 once the cable stop 1440 is installed. The cable 1428 may be secured to the cable stop 1440 by crimping, swedging, or any other suitable means, without falling beyond the spirit and scope of the present invention.

Further, it should be understood that the aperture 1436 and cable stop 1440 are merely examples of means for coupling the cable 1428 with the projection 1432 and inner housing 1426 within the spirit and scope of the present invention, and any other suitable means could be used, without falling beyond the spirit and scope of the present invention, such as other examples described herein. Further, the projection 1432 is shown as a separate component from the inner housing 1426, however, in some embodiments, the projection 1432 could be integrally and/or unitarily formed with the inner housing 1426, such that the projection 1432 is merely an extension of the inner housing 1426 at its distal end 1550; or the projection 1432 could be eliminated entirely.

The outer housing 1422 forms a bore 1442 and is slid over a proximal end 1554 of the inner housing 1426. The inner housing 1426 is positioned in the bore 1442 of the outer housing 1422, such that the outer housing 1422 telescopically overfits the inner housing 1426 with a sliding fit. The outer housing 1422 may form a cross-sectional shape which is generally circular, with the inner housing 1426 forming a cross-sectional shape which corresponds with the shape of the outer housing 1422. In this example, the housings 1422, 1426 are generally formed as right circular cylinders. The inner housing 1426 includes a rod 1534 and a plunger 1548 located at a proximal end 1554 of the rod of the inner housing 1426, which are located inside the bore 1442 of the outer housing 1422 in a pre-deployment state of the pretensioner 1420. In some embodiments, the plunger 1548 remains within the bore 1442 in a deployed state, as well as in a pre-deployment state; likewise, the rod 1534 may remain partially within the bore 1542 in the deployed state. The projection 1432 is located entirely outside of the bore 1442 of the outer housing 1422 in this embodiment.

Like previous examples, the outer housing 1422 and the inner housing 1426 form an expanding chamber 1444 that enlarges when pressurized by a gas generator 1446. Upon activation, the gas generator 1446 pressurizes the expanding chamber 1444, which causes it to expand and drive the inner housing 1426 along the bore 1442 of the outer housing 1422 to exert tension on the cable 1428. As such, the distal end 1550 of the inner housing 1426 is driven away from the outer housing 1422, and a distal end portion 1551 of the inner housing 1426 is driven out of the bore 1442 of the outer housing 1422 to exert tension on the cable 1428. The distal end portion 1551 may include all or part of the rod 1534. It may also include all or part of the plunger 1548.

The gas generator 1446 maybe retained within a mounting cavity 1448 within the outer housing 1422, at a proximal end 1450 of the outer housing 1422. It may be retained by a retaining feature 1451 or a flange 1530, such as those described above, by way of example. The cavity 1448 communicates with the bore 1442 of the outer housing and is generally coaxially aligned with the bore 1442. Gas flows from the gas generator 1446 to the expanding chamber 1444 within the bore 1442 of the outer housing 1422. The gas generator 1446 may be a pyrotechnic microgas generator, as described above. Once the gas escapes from the gas generator 1446 and into the expanding chamber 1444, the expanding chamber 1444 expands, causing the inner housing 1426 to travel within the bore 1442. In the orientation shown in FIGS. 14 and 15, the inner housing 1426 travels in the right-hand direction and exerts tension on and pulls the cable 1428 in the right-hand direction. In the orientation of the pretensioner 1420 shown in FIG. 16, the pretensioner 1420 is mounted vertically within a vehicle, such that upon activation of the gas generator 1446, the inner housing 1426 travels upward to exert tension on the cable 1428.

The pretensioner 1420 may include means for preventing inner housing 1426 from moving in a reverse direction after actuation, such as a one-way clutch 1456, which may be similar to the one-way clutches described above. One or more seals 1464 for gas retention are positioned around the exterior side 1460 of the plunger 1548, located between the plunger 1548 and the inner surface 1462 of the outer housing 1422. The seals 1464 could also or alternatively be located around the piston rod 1534, between the piston rod 1534 and the inner surface 1462 of the outer housing 1422. These seals 1464 seal the expanding chamber 1444 and substantially prevent gas from leaking out of the bore 1442 of the outer housing 1422.

A pretensioner end portion 1429 of the cable 1428 is routed from the cable stop 1440 at one end of the cable 1428, through the aperture 1436 of the projection 1432, and generally parallel to the outer housing 1422 and the inner housing 1426. An intermediate portion 1431 of the cable is connected to the pretensioner end portion 1429. The intermediate portion 1431 of the cable 1428 is routed around a guide 1468, which may be a round portion, of a cantilevered guide feature 1470 extending from the outer housing 1422. The guide 1468 may be a stationary pulley or a non-stationary pulley, by way of example, and it may form an outer perimeter groove 1474 for guiding the cable 1428. The guide feature 1470 is used to contact and guide the flexible cable 1428 around an arc for application in the vehicle, as shown in FIG. 16. For example, the cable 1428 is routed 180° around the guide 1468 for installation below a B-Pillar 1572 of an automobile in a vertical arrangement.

The routing of the cable 1428 continues from the guide 1468 to a fastening feature 1484 that connects it to a buckle 1430 or another seat belt system component, such as a belt anchor or guide loop, depending on the desired vehicle application. Accordingly, the intermediate portion 1431 of the cable 1428 is connected to a belt end portion 1433 of the cable 1428. The belt end portion 1433 is routed adjacent to and generally parallel with the inner and outer housings 1426, 1422. The belt end portion 1433 of the cable 1428 is also routed generally parallel to the pretensioner end portion 1429 of the cable 1429. In this embodiment, the belt end portion 1433 and the pretensioner end portion 1429 are able to be routed generally parallel to each other because the intermediate portion 1431 is routed 180° around the guide 1468. The belt end portion 1433 is routed through a belt side aperture 1575 in the projection 1432, and the belt end portion 1433 continues to the fastening feature 1484 connected to the buckle 1430 or other belt restraint component. In the alternative, the belt end portion 1433 could run from the intermediate portion 1431 to the fastening feature 1484 and buckle 30 without passing through a belt side aperture 1575 in a projection 1432.

With reference to FIG. 16, the pretensioner 1420 and cable 1428 are routed such that the pretensioner 1420 and each portion 1429, 1431, 1433 of the cable may be covered by a single generally rectangular shroud 1580. The buckle 1430 or other belt restraint component is also located within the shroud 1580 and connects to seat belt webbing 1582. Therefore, the shroud 1580 and pretensioner 1420 may be installed below and parallel to the B-Pillar 1572 (or C-Pillar) of an automobile in a vertical arrangement perpendicular to the ground.

In some forms, the cable 1428 remains free from contact with the inner housing 1426 and the gas generator 1446; it is coupled with the projection 1432, which is located outside of the bore 1442 of the outer housing 1422. In other words, the cable 1428 is located entirely outside of the bore 1442 of the outer housing 1422. Therefore, the linear pretensioner 1420 remains free of leak paths adjacent the cable 1428. The pretensioner 1420 also remains free of leak paths through the inner housing 1426. In this example, the cable 1428 is located entirely outside of the inner housing 1426, as well as the outer housing 1422.

When the motor vehicle occupant restraint system calls for actuation of the pretensioner 1420, a firing signal is sent to gas generator 1446 which pyrotechnically generates a rapidly expanding gas that pressurizes the expanding chamber 1444 between the plunger 1548 of the inner housing 1426 and the gas generator 1446, within the bore 1442 of the outer housing 1422. This forces the inner housing 1426 to move axially in the right-hand direction (as shown in FIGS. 14-15) to stroke within the bore 1442 of the outer housing 1422. When installed, as shown in FIG. 16, the linear pretensioner 1420 moves in the upward direction when actuated.

The length of cable 1428 may be chosen such that the inner housing 1426 will not stroke so far as to allow the inner housing 1426 to escape from the bore 1442 of the outer housing 1422 after actuation, or other mechanical features can be provided to limit the maximum stroke of the inner housing 1426, such as putting a bead or other feature along the length of the cable 1428 that will stop the cable 1428 from advancing once the bead strikes a portion of the guide feature 1470. For example, a bead could be placed on the belt end portion 1433 of the cable 1428 adjacent to the belt side aperture 1575 in the projection 1432, just to the left of the projection 1432 in the orientation of FIGS. 14 and 15.

Forcible motion of the inner housing 1426 pulls the cable 1428 around the guide 1468 of the guide feature 1470, which pulls on seat belt buckle 1430. This action provides the pretensioning displacement for the belt system, desired for enhancing belt restraint system performance.

Referring to FIG. 15, the guide feature 1470 has side plates 1586 that extends along a front side 1471 and back side 1473 of the round guide 1468. The side plates 1586 could be extensions from a U-shaped bracket, similar to the U-shaped bracket of the guide feature 1270 shown in FIG. 13. The U-shaped bracket may be formed of one or more components.

For example, a guide plate substantially similar to the guide plate 72 shown and described in FIGS. 2-4 may be used to form the front side 1471 of the guide feature 1470.

The guide 1468 forms a groove or channel 1474 through which the intermediate portion 1431 of the cable 1428 passes. The cable 1428 extends through the channel 1474 and wraps around the guide 1468 of the guide feature 1470. A fastener 1588 may be inserted through a hole 1480, such as a bore, in the guide feature 1470. In some embodiments, the fastener 1588 may attach the pretensioner 1420 to the vehicle structure.

The outer housing 1422 is adapted to be fixed to the motor vehicle structure and remain stationary upon deployment of the gas generator 1446. The outer housing 1422 may be fixed to the vehicle structure in any suitable way, such as the means described above, by way of example.

While the above description contains examples of the present invention, it will be appreciated that the invention is susceptible to modification, variation, and change without departing from the proper scope and fair meaning of the accompanying claims. For example, instead of fixing the main housing to the motor vehicle, the stroking housing could instead be fixed to the motor vehicle, allowing the main housing to move in a left-hand direction (in the orientation of FIGS. 1, 5A, and 6-10) to exert tension on the flexible cable. Other variations could include a rigid cable, in other words, a rod, instead of a flexible cable. Further, the cable need not be routed around the guide feature; instead, it could be routed in another direction or could remain parallel with the stroking housing.

The present disclosure is merely exemplary in nature and, thus, variations that do not depart from the gist of the disclosure are intended to be within the scope of the present disclosure. Such variations are not to be regarded as a departure from the spirit and scope of the present disclosure.

The invention claimed is:

1. A linear pretensioner for use as part of a motor vehicle occupant belt restraint system mountable to a motor vehicle structure and coupled with a belt restraint system component, and upon being activated, pulls the belt restraint system component to pretension the belt restraint system, the pretensioner comprising:
   a stroking housing forming a longitudinal bore,
   a cable coupled with the stroking housing and to the belt restraint system component, the cable being coupled to the stroking housing at an attachment location laterally offset from and longitudinally overlapping with the bore; and
   a main housing adapted to be fixed to the motor vehicle structure, the main housing positioned in the bore of the stroking housing, the stroking housing telescopically overfitting the main housing and being axially guided only on an internal surface of the stroking housing, the main housing and the stroking housing forming an expanding chamber that enlarges when pressurized by a gas generator, wherein upon activation, the gas generator drives the stroking housing along the main housing to exert tension on the cable, the main housing further comprising a guide feature laterally extending therefrom and configured to contact and guide the cable generally parallel to the bore from the attachment location to the guide feature.

2. The linear pretensioner in accordance with claim 1, the main housing being configured to remain stationary upon the activation of the gas generator.

3. The linear pretensioner in accordance with claim 1, wherein the gas generator is located within the main housing.

4. The linear pretensioner in accordance with claim 1, wherein the pretensioner is free of leak paths adjacent to the cable.

5. The linear pretensioner in accordance with claim 1, wherein the pretensioner is free of leak paths through the main housing.

6. The linear pretensioner in accordance with claim 1, wherein the cable remains free from direct contact with the gas generator.

7. The linear pretensioner in accordance with claim 1, further comprising a cable stop secured to the cable to assist with retaining the cable to the stroking housing, the cable stop being located outside of the main housing and the stroking housing.

8. The linear pretensioner in accordance with claim 1, wherein the stroking housing is slid over an open end of the main housing.

9. The linear pretensioner in accordance with claim 1, the cable being routed adjacent to the stroking housing, the cable being located outside of the main housing and the stroking housing.

10. The linear pretensioner in accordance with claim 1, further comprising a seal located around an exterior side of the main housing, the seal being located between the main housing the stroking housing.

11. The linear pretensioner in accordance with claim 1, wherein the gas generator is retained within a cavity formed within the stroking housing.

12. The linear pretensioner in accordance with claim 1, the stroking housing further comprising a rod within the bore of the stroking housing, the main housing forming a main housing bore, the rod extending into the main housing bore.

13. The linear pretensioner in accordance with claim 1, wherein the stroking housing forms a cross-sectional shape which is generally circular and wherein the main housing forms a cross-sectional shape which corresponds with the shape of the stroking housing.

14. The linear pretensioner in accordance with claim 13, the main housing and the stroking housing generally being formed as right circular cylinders.

15. The linear pretensioner in accordance with claim 1, further comprising a projection extending from an exterior side of the stroking housing, the projection being configured to assist with retaining the cable with the stroking housing.

16. The linear pretensioner in accordance with claim 15, further comprising a cable stop secured to the cable, the cable passing through an aperture in the projection, and the cable stop secured to the cable adjacent the aperture to retain the cable to the stroking housing.

17. The linear pretensioner in accordance with claim 1, further comprising a one-way clutch disposed within the stroking housing and configured to permit movement of the stroking housing along the main housing in an outward direction while preventing movement of the stroking housing in an opposed direction.

18. The linear pretensioner in accordance with claim 17, wherein the one-way clutch includes bearings disposed between an exterior surface of the main housing and an inner surface of the stroking housing, the bearings and the exterior surface and the inner surface cooperating to permit movement of the stroking housing in the outward direction and prevent movement of the stroking housing in the opposed direction.

19. The linear pretensioner in accordance with claim 1, wherein the guide feature is a cantilevered guide feature.

20. The linear pretensioner in accordance with claim 19, the main housing further comprising a guide plate, the guide plate cooperating with the guide feature to create a channel through which the cable passes.

21. The linear pretensioner in accordance with claim 1, wherein the gas generator is located at a distal end of the main housing, the distal end being adjacent to the expanding chamber.

22. The linear pretensioner in accordance with claim 21, further comprising electrical firing lines configured to transmit a firing signal to the gas generator, the electrical firing lines extending from the gas generator and through a length of the main housing to a proximal end of the main housing, the proximal end being located at an opposite end of the main housing from the distal end.

23. The linear pretensioner in accordance with claim 21, further comprising electrical firing lines configured to transmit a firing signal to the gas generator, the electrical firing lines extending from the gas generator, into the bore of the stroking housing, and through an opening in the stroking housing.

24. The linear pretensioner in accordance with claim 1, the main housing forming a passageway therein, the gas generator communicating with the passageway of the main housing.

25. The linear pretensioner in accordance with claim 24, wherein the passageway of the main housing passes through a length thereof and is configured to carry gas through it and into the bore of the stroking housing.

26. The linear pretensioner in accordance with claim 24, wherein the gas generator is retained within a cavity formed within the main housing.

27. The linear pretensioner in accordance with claim 26, wherein the cavity to retain the gas generator communicates with the passageway of the main housing and is generally coaxially aligned with the passageway.

28. The linear pretensioner in accordance with claim 27, wherein the main housing forms an inner chamber located between the passageway and the cavity, the inner chamber being in coaxial alignment with the passageway and the cavity.

* * * * *